(12) United States Patent
Limberg

(10) Patent No.: US 7,133,082 B2
(45) Date of Patent: Nov. 7, 2006

(54) DIGITAL TELEVISION RECEIVER WITH REMOTE TUNER FOR DRIVING TRANSMISSION LINE WITH INTERMEDIATE-FREQUENCY SIGNAL

(76) Inventor: Allen Le Roy Limberg, 1053 Kensington St., Port Charlotte, FL (US) 33952

( * ) Notice: Subject to any disclaimer, the term of this patent is extended or adjusted under 35 U.S.C. 154(b) by 1014 days.

(21) Appl. No.: 09/757,019

(22) Filed: Jan. 9, 2001

(65) Prior Publication Data
US 2003/0007103 A1  Jan. 9, 2003

(51) Int. Cl.
*H04N 5/44* (2006.01)
(52) U.S. Cl. .................. 348/725; 348/726; 455/20; 455/353; 725/81
(58) Field of Classification Search ........... 348/731, 348/732, 733, 725, 723, 734, 726, 724, 737; 455/151.1, 150.1, 151.3, 192.1, 193.1, 255, 455/256, 14, 352, 353, 20–22; 375/316; 725/81
See application file for complete search history.

(56) References Cited
U.S. PATENT DOCUMENTS

| | | | | |
|---|---|---|---|---|
| 3,575,661 A | * | 4/1971 | Slavik | 455/151.1 |
| 4,023,108 A | * | 5/1977 | Torii | 455/183.1 |
| 4,145,720 A | * | 3/1979 | Weintraub et al. | 725/81 |
| 4,205,269 A | * | 5/1980 | Watanabe | 725/149 |
| 4,551,688 A | * | 11/1985 | Craiglow | 330/280 |
| 4,608,710 A | * | 8/1986 | Sugiura | 725/68 |
| 4,670,790 A | * | 6/1987 | Sawada et al. | 348/726 |
| 5,809,088 A | * | 9/1998 | Han | 375/344 |
| 6,118,499 A | * | 9/2000 | Fang | 348/726 |

* cited by examiner

*Primary Examiner*—Michael H. Lee

(57) ABSTRACT

An outdoor-antenna digital television receiver system has an electrically controlled remote tuner located close to the antenna. In response to a remote control signal, the remote tuner selects a particular radio-frequency digital television signal to be received, converts that RF DTV signal to an intermediate-frequency digital television signal of prescribed carrier frequency, and drives a downlead transmission line, preferably a coaxial cable. Indoors, the downlead transmission line is provided with an echo-free termination This echo-free termination may be in a "set-top" box that includes a frequency up-conveter that converts the IF DTV signal back to an RF DTV signal for reception by a conventional digital television receiver. Alternatively, the echo-free termination may be in a special DTV receiver without a local tuner. In such a special DTV receiver the IF DTV signal developed across the echo-free termination is supplied to circuitry for demodulation and analog-to-digital conversion, which circuitry supplies digitized baseband DTV signal.

33 Claims, 11 Drawing Sheets

DIGITAL TELEVISION RECEIVER WITH REMOTE TUNER FOR DRIVING TRANSMISSION LINE WITH INTERMEDIATE-FREQUENCY SIGNAL

The invention relates to receving for digital television (DTV) signals.

BACKGROUND OF THE INVENTION

The digital television (DTV) signals currently broadcast in the United States of America employ 8-level vestigial-sideband amplitude-modulation of a suppressed carrier 310 kilohertz above the lower boundary frequency of a 6-megahertz-wide television channel allocation. A fixed-amplitude pilot carrier at the frequency and phase of the suppressed carrier accompanies this 8-VSB signal. The 8-VSB signal is demodulated in the digital television receiver to recover an 8-level baseband DTV signal subjected to data slicing procedures during symbol decoding. Linearity of the DTV signal during its transmission and reception must be preserved, so that the data slicing procedures have low enough rate of errors that the errors are nearly always correctable in reliance upon forward-error-correction coding. The 8-VSB signal has a 10.76 million symbols per second baud rate. Therefore, good echo-suppression is also necessary for low error rate when data-slicing the baseband DTV signal.

Equalization of the transmission channel and suppression of echoes is a matter of considerably more importance in DTV signal reception than in analog television signal reception. Over-the-air transmissions are also affected by multipath reception in which signals are received over more than one path, which paths tend to differ in length and thus give rise to effects similar to echoes in a transmission line. Accordingly, these multipath effects are coin in only termed "echoes". Usually the strongest signal is considered to be a principal signal. A signal arriving before that principal signal is termed a "pre-echo" or "pre-ghost", and a signal arriving after that principal signal is termed a "post-echo" or "post-ghost". While multipath reception causes ghost images on the television viewscreen during analog TV signal reception, complete loss of viewable picture rarely occurs and that loss is usually due to loss of display synchronization or excessive noisiness of the picture owing to weak-signal reception. The audio signal accompanying an analog TV video signal is acceptable so long as there is viewable picture and often persists even when viewable picture is lost. Multipath or other echo-producing conditions can cause simultaneous complete loss of picture and sound during DTV signal reception. Such loss occurs whenever the error rate of data slicing the baseband DTV signal is too great to be correctable in reliance upon forward-error-correction coding. Adaptive digital filtering for channel-equalization and echo-suppression is usually employed prior to data slicing the baseband DTV signal. This adaptive filtering suppresses the pre-echoes and post-echoes accompanying the principal signal, but exacts a penalty in carrier-to-noise ratio (C/N). If C/N becomes too small, data slicing of the baseband DTV signal exhibits excessive error because the noise is large enough to cause errors in distinguishing between data modulation levels.

DTV signal reception is generally considerably better when an in-doors DTV receiver uses an outdoor antenna, rather than an indoor antenna. Losses in field strength owing to attenuation in building materials are avoided by using the outdoor antenna, so carrier strength is boosted vis-à-vis the internal noise of the receiver to improve C/N. Also, changes in field strength and multipath conditions may occur with indoor antenna reception owing to people and pets moving around in the antenna field. Highly directive outdoor antennas, such as yagis, can reduce the strength of multipath vis-à-vis the principal component of received signal, reducing the need for extensive channel-equalization and its attendant penalty in carrier-to-noise ratio (C/N).

The outdoor antenna is coupled to the indoor receiver via a download, which downlead exhibits a transmission loss that is often significant. A common practice to offset these transmission losses, and to boost signal strength in weak signal-strength reception areas, is the installation of a wide-band radio-frequency (RF) amplifier close to the antenna. This wide-band amplifier amplifies the radio-frequency signals supplied from the antenna via a balun and drives a coaxialable downlead to the indoor receiver. This practice is one taken over from analog television signal reception practice.

When a wide-band RF amplifier close to the antenna is used for driving a coaxial-cable downlead to an indoor receiver, care must be taken to avoid strong antenna response at certain wavelengths driving the amplifier into non-linear operation. This overload condition is not only deleterious to the linearity of a strong DTV signal, but causes cross-modulation with any accompanying weaker DTV signal, adversely affecting its linearity as well. These losses of linearity will raise the rate of errors in data slicing the baseband DTV signal sufficiently that the errors no longer are correctable in reliance upon forward-error-correction coding. Filtering to attenuate a strong-signal channel can be introduced into the coupling between the antenna and the wide-band RF amplifier, but the design of the filtering becomes onerous when more than one strong-signal channel must be attenuated. Generally, a TV service technician in the field will be unable to solve these reception problems optimally.

Over-the-air terrestrial television broadcasting is done in the United States of America using 6 MHz wide channels located in three discrete frequency bands, TV broadcast channels 2 through 6 are in a lower VHF band extending from 54 to 88 MHz. TV broadcast channels 7 through 13 are in an upper VHF band extending from 174 to 216 MHz. TV broadcast channels 14 through 83 are in a UHF band extending from 470 to 890 MHz, but some of these upper-most UHF channels will no longer be available for TV broadcasting. When a wide-band RF amplifier close to the antenna is used for driving a coaxial-cable downlead to an indoor receiver, there is difficulty in terminating this transmission line with its characteristic impedance for all of the TV broadcast channels. The coaxial-cable downlead appears to be an infinite-length transmission line for DTV signals broadcast at frequencies for which the coaxial cable is terminated with its characteristic impedance. So, there will be no reflections in the downlead when receiving such a DTV signal TV signals broadcast at signal frequencies at which this transmission line is not terminated with its characteristic impedance will be subject to echoes caused by reflections in the downlead, however. The downlead will often be a source of echoes for some of the DTV signals received by the DTV receiver with outdoor antenna, whether a wide-band RF amplifier is used to drive the downlead, or whether the downlead connects directly from the antenna. The design of a tuner that exhibits characteristic impedance at its RF input connection for every channel in each of the three discrete frequency ranges is extremely difficult, even when different RF stages are used for the UHF and VHF bands.

The inventor points out that thinking about television system design is influenced by TV receiver design of the distant past. Originally, rather sizable electro-mechanical devices were used for channel selection, which devices were operated manually by the human viewing and listening to the TV receiver. These devices are not well suited for inclusion within a remote tuner that is located nearby an outdoor antenna or incorporated into the structure of the antenna. When remote-control devices for tuning TV receivers became commonplace, electrically controlled tuning displaced electro-mechanical devices for channel selection. In recent years monolithic integrated circuitry and surface-acoustic-wave (SAW) filters have virtually eliminated the need for servicing the low-power electronics portions of TV receivers; there is no longer need for replacing vacuum tubes or re-tuning tuned circuitry that has drifted from correct tuning. The monolithic integrated circuitry and SAW filters have reduced the size of the front-end section of a TV receiver, up to and including the intermediate-frequency (IF) amplifier.

The inventor points out that the improvement in reliability and reduction in size of this front-end section of the TV receiver makes feasible a remote tuner located nearby an outdoor antenna or incorporated into the structure of the antenna. This remote tuner is designed to drive a coaxial-cable downlead with intermediate-frequency (IF) signal. In order to eliminate reflections of the IF signal, the coaxial cable is terminated with its characteristic impedance in the IF signal frequency range. Since any TV channel the remote tuner selects for reception is converted to repose in the same 6 MHz wide IF channel, the input coupling network required to terminate the coaxial cable in its characteristic impedance is the same, no matter which TV channel is selected for reception. This eliminates need for re-tuning, the input coupling network in order to terminate the coaxial cable in its characteristic impedance when different DTV broadcast channels are selected for reception.

Preferably, reflex methods are employed to carry up operating power and remote-control signals to the remote tuner via the coaxial-cable downlead. Alternatively, operating power can be conducted to the remote tuner via separate connection. The remote-control signals for the remote tuner can be conducted to it via separate connection. Modulation of a carrier with the remote-control signals facilitates the remote-control signals being conducted to the remote tuner via the coaxial-cable downlead by frequency multiplexing.

The remote tuner is more easily designed to avoid being overloaded by strong signals than a wide-band RF amplifier is. The remote-control signals for the remote tuner can be used to control electric tuning of input coupling to the RF amplifier input stage of the remote tuner, as well as to control output coupling of that stage to the following mixer and to control the frequency of local oscillations applied to the mixer. The selectivity of the tuned input coupling to the RF amplifier input stage will reject strong signals not selected for reception, particularly those strong signals in channels more remote from that channel selected for reception.

The remote tuner is preferably designed to include an envelope detector following its final IF voltage amplifier stage. Peaks of the envelope are detected to develop an automatic gain control (AGC) signal applied to the IF voltage amplifier stages. A delayed AGC signal is developed for application to the RF amplifier input stage of the remote tuner, so that a strong signal selected for reception will be prevented from overloading that stage and driving it into non-linear operation.

SUMMARY OF THE INVENTION

An outdoor-antenna digital television receiver system constructed in accordance with the invention has an electrically controlled remote tuner located close to the antenna. In response to a remote control signal, the remote tuner selects a particular radio-frequency digital television signal to be received, converts that RF DTV signal to an intermediate-frequency digital television signal of prescribed carrier frequency, and drives a downlead transmission line, preferably a coaxial cable. Indoors, the downlead transmission line is provided with an echo-free termination for the frequency range in which the IF DTV signal reposes. This echo-free termination may be in a "set-top" box which includes a frequency upconverter that converts the IF DTV signal back to an RF DTV signal for reception by a conventional digital television receiver. Alternatively, the echo-free termination may be in a special DTV receiver without a local tuner. In such a special DTV receiver the IF DTV signal developed across the echo-free termination is supplied to circuitry for demodulation and analog-to-digital conversion, which circuitry supplies digitized baseband DTV signal.

DETAILED DESCRIPTION OF THE INVENTION

Figure 1:
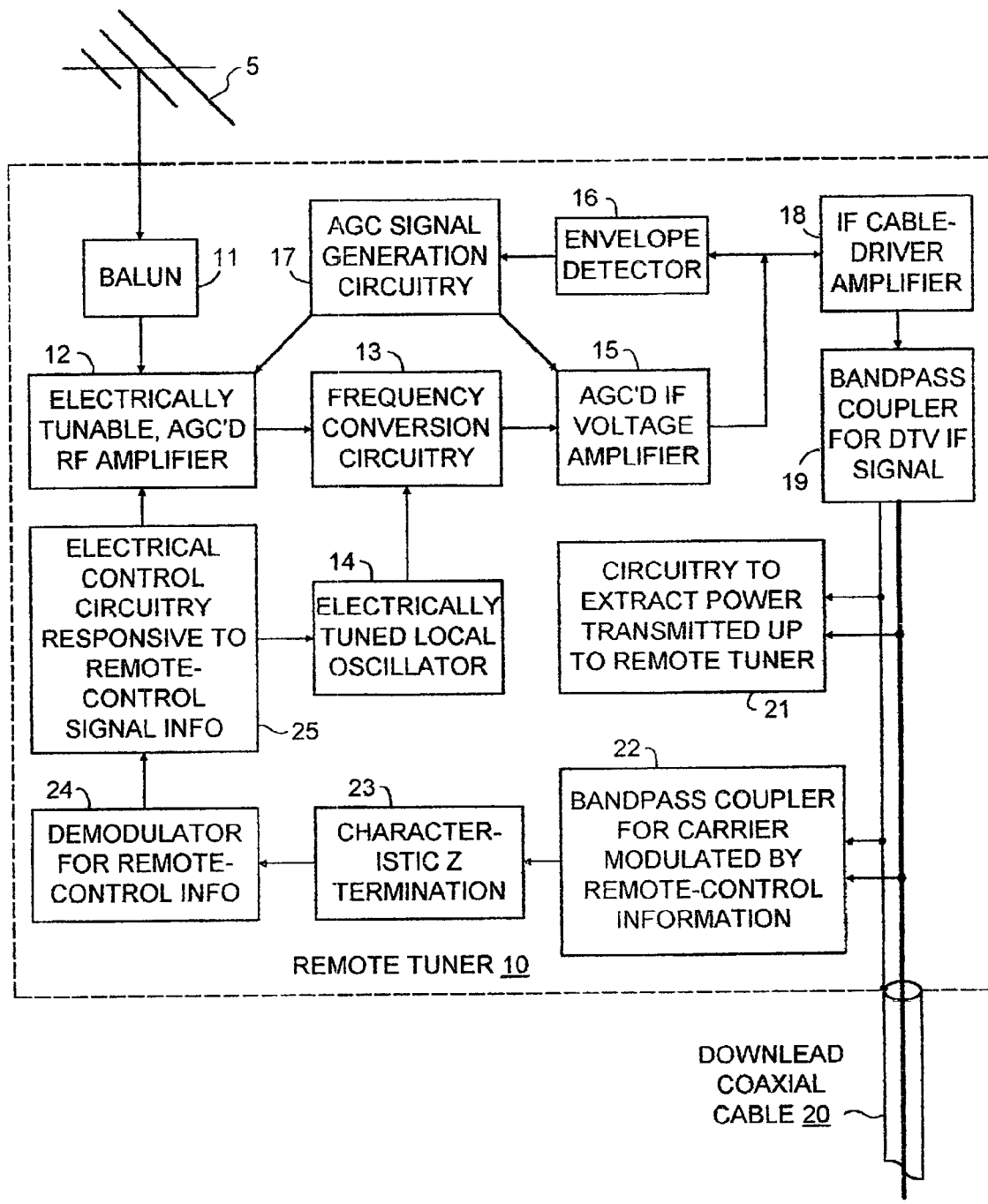
FIG. 1 is a schematic diagram of a remote tuner constructed in accordance with the invention, located near an outdoor antenna connecting thereto, and connected to a coaxial-cable downlead that the tuner drives with an intermediate-frequency DTV signal downconveted from a radio-frequency DTV signal selected for reception.

FIG. 1 shows an outdoor antenna 5 connected to a nearby tuner 10 constructed in accordance with the invention for being located remotely from the rest of the digital television receiver, which is located indoors. The antenna 5 connects via a balun 11 to a radio-frequency amplifier stage 12 in the remote tuner 10 and supplies that RF amplifier stage 12 with radio-frequency signal. The amplified radio-frequency signal from the RF amplifier stage 12 is converted to an intermediate-frequency signal by frequency-conversion circuitry 13 in the tuner 10, which frequency-conversion circuitry 13 includes an electrically tunable local oscillator 14 for selecting the DTV channel to be converted to the intermediate-frequency signal. In actual practice, the electrically tunable local oscillator 14 is likely in fact to comprise one of the types of circuitry commonly referred to as a "frequency synthesizer", which types of circuitry are already employed in TV receivers.

The tuner 10 may be of single-conversion type in which the frequency-conversion circuitry 13 includes only a single mixer following the RF amplifier stage 12, which mixer superheterodynes the RF amplifier stage 12 output signal with oscillations from the electrically tunable local oscillator 14 in a down-conversion procedure that generates an very-high-frequency (VHF) or lower-band intermediate-frequency signal to be amplified by a subsequent intermediate-frequency voltage amplifier 15. Alternatively, in better-quality DTV receivers, the tuner 10 may be of double-conversion type in which the frequency-conversion circuitry 13 includes two mixers, a first mixer used for a frequency up-conversion and a second mixer used for a subsequent frequency down-conversion. In a doubleconversion tuner, the first mixer following the RP amplifier stage 12 heterodynes the RF amplifier stage 12 output signal with oscillations from the electrically tunable local oscillator 14 in an up-conversion procedure that generates an ultra-high-frequency (UHF) intermediate-frequency signal. This UHF IF signal is filtered to reject image frequencies, and the filtered UHF signal is supplied to a second mixer. The second mixer heterodynes the filtered UHF signal with oscillations from a UHF local oscillator in a down-conversion procedure that generates a very-high-frequency (VHF) or lower-band intermediate-frequency signal to be amplified by a subsequent intermediate-frequency voltage amplifier 15.

The IF voltage amplifier 15 is of a controlled-voltage-gain type with automatic gain control (AGC). The amplified IF signal that the IF voltage amplifier 15 supplies as its output signal is supplied as input signal to an envelope detector 16. The envelope detector 16 is arranged for detecting the varying envelope of the amplified IF signal from the IF voltage amplifier 15 and supplying these envelope variations to automatic-gain-control (AGC) signal generation circuitry 17. The AGC signal generation circuitry 17 is designed to respond to these envelope variations to generate AGC signal for application to the controlled-voltage-gain IF voltage amplifier 15 and to generate delayed AGC signal for application to the controlled-voltage-gain RF voltage amplifier 12.

The circuitry in the remote tuner 10 comprising the RF voltage amplifier 12, the frequency-conversion circuitry 13, the electrically tunable local oscillator 14, the IF voltage amplifier 15, the envelope detector 16 and the AGC signal generation circuitry 17 is substantially the same as found in one or other prior-art DTV receiver design. The remote tuner 10 departs from conventional design in that the amplified IF signal from the IF voltage amplifier 15 is not immediately applied to nearby demodulation and analog-to-digital conversion circuitry.

Instead, the amplified IF signal from the IF voltage amplifier 15 is applied as input signal to an IF cable-driver amplifier 18. The cable-driver amplifier 18 is a power amplifier for the amplified IF signal, supplying it through a bandpass coupler 19 to a downlead coaxial cable 20. The source impedance of the cable-driver amplifier 18 is not larger than being comparable with the characteristic impedance of the coaxial cable 20. The source impedance of the cable-driver amplifier 18 can be designed to be the characteristic impedance of the coaxial cable 20, to reduce the possibility of secondary reflections of the amplified IF signal in the cable 20. However, the cable-driver amplifier 18 can alternatively be designed to have a source impedance lower than the characteristic impedance of the coaxial cable 20. The characteristic impedance of the coaxial cable 20 can be 51 to 125 ohms pure resistance, for example, supposing its inner conductor is straight-wire in nature. RG-59/U, which has a characteristic impedance of 75 ohms pure resistance, is commonly used as a downlead from a balun at the antenna, to facilitate the balun providing an impedance-matched connection from a 300-ohm antenna. Since the remote tuner 10 uses the cable-driver amplifier 18 to drive the coaxial cable 20, there is no need for the downlead to have a characteristic impedance of 75 ohms. The operating current requirements for circuitry driving signal through the cable 20 can be reduced almost twenty-fold by using a coaxial cable with an inner conductor wound as a single-layer coil. RG-65/U has a characteristic impedance of 950 ohms pure resistance. Other coaxial cable designs wind the inner conductor as a single-layer coil on a flexible magnetic core material to achieve characteristic impedances of 1600 to 2800 ohms pure resistance Insofar as cable prices permit, it is generally preferable that the coaxial cable 20 have a characteristic impedance of 950 ohms or more. A downlead with twin conductors spaced apart can be used to get higher characteristic impedance, but lack of grounded shielding makes radiation of IF signals from such downlead more of a problem than is the case with grounded-shield coaxial cable. So, coaxial-cable downlead is preferred as a downlead transmission line.

The bandpass coupler 19 is a wideband filter, which can be constructed using inductors and capacitors, but can be more compactly constructed using ceramic resonator elements. The bandpass coupler 19 is transparent to the IF signal supplied from the cable-driver amplifier 18, but presents a high impedance to the coaxial cable 20 at the low frequencies at which power is cabled up to the remote tuner 10 via the cable 20. This high impedance usually is owing to the inclusion of a blocking capacitor in the connection of the bandpass coupler 19 to the center conductor of the coaxial cable 20. The bandpass coupler 19 also presents a high impedance to the coaxial cable 20 at frequencies where the cable 20 carries other signals in frequency multiplex with the IF signal supplied from the cable-driver amplifier 18.

The remote tuner 10 includes circuitry 21 to extract power from the cable 20 for powering the tuner 10. The outside conductor of the coaxial cable 20 is grounded as part of the normal arrangements to secure protection against lightning strike, and the circuitry 21 includes a grounded smoothing capacitor across which the direct voltage for the tuner 10 power supply is maintained. A choke coil in the circuitry 21 input connection from the inside conductor of the coaxial cable 20 presents a high impedance to the IF signal supplied from the cable-driver amplifier 18 and other signals in frequency multiplex with that IF signal. In embodiments of the invention in which the power transmitted up to the tuner 10 via the cable 20 is direct-current in nature, the direct-current power is conducted from the inside conductor of the coaxial cable 20 to the grounded smoothing capacitor in the circuitry 21 via the choke coil. In some embodiments of the invention the power transmitted up to the tuner 10 via the cable 20 is alternating-current in nature. The alternating-current extracted from the inside conductor of the coaxial cable 20 via the choke coil is rectified in the circuitry 21 to develop direct voltage across the grounded smoothing capacitor therein. Different embodiments of the invention in which the circuitry 21 includes half-wave rectification circuitry, transformerless full-wave rectification circuitry, or rectification circuitry with an isolating transformer for converting low-frequency alternating-current power to direct-current power are possible, of course Supposing the transistors in the remote tuner 10 are operated with supply voltages of only a few volts, the use of a stepdown isolation transformer in the circuitry 21 facilitates operating power being cabled up via the coaxial cable 20 at higher voltage and lower current, so I.sup.2R losses are lowered for a long cable run Cabling up power at a frequency higher than the 60 Hertz electrical mains frequency —e.g., 400 or 1000 Hz—reduces the bulk and weight of a stepdown transformer in the circuitry 21.

The remote tuner 10 is arranged for receiving remote-control signals transmitted from an indoor location via the coaxial cable 20. The remote-control signal information modulates a carrier frequency. The modulation may, by way of example, be a multiple-tone type of modulation, as commonly used for television receiver remote control. A bandpass coupler 22 is transparent to the carrier modulated with remote-control signal information, but presents a high impedance to the coaxial cable 20 insofar as the IF signal supplied from the cable-driver amplifier 18 is concerned. The bandpass coupler 22 also presents a high impedance to the coaxial cable 20 at the frequencies at which power is transmitted up to the remote tuner 10. This high impedance usually is owing to the inclusion of a blocking capacitor in the connection of the bandpass coupler 22 to the center conductor of the coaxial cable 20. The bandpass coupler 22 couples the coaxial cable 20 to a characteristic-impedance termination 23 for the cable 20, so the cable 20 is provided with an echo-free termination for the carrier modulated with remote-control signal information. The cable 20 appears to the source of that modulated carrier to be an infinite-length transmission line, since there is no echo signal reflected back to that source. The characteristic-impedance termination 23 is essentially a pure resistance for the carrier modulated with remote-control signal information and will in some embodiments of the remote tuner 10 essentially consist of a resistor. In usual practice, the reactive components in the bandpass coupler 32 provide tuning that negates the effects of stray reactance shunting the resistance of termination 23.

The carrier modulated with remote-control signal information that appears at the characteristic-impedance termination 23 is applied to a demodulator 24, which demodulates the carrier and supplies the demodulated remote-control signal information to electrical control circuitry 25. The electrical control circuitry 25 converts the demodulated remote-control signal information to control signals for the electrically tunable RF amplifier 12 and for the electrically tuned local oscillator 14. More particularly, where a multiple-tone type of modulation is used for transmitting remote-control signal information, the electrical control circuitry 25 includes selective filtering for each of the tones and detectors for detecting pulse modulation of the tones. The electrical control circuitry 25 further includes digital memory addressed by channel identifier signal derived from tone pulse modulation which memory stores, for each of its addresses, channel-selection control signal values for application to the electrically tunable RF amplifier 12 and channel-selection control signal values for application to the electrically tuned local oscillator 14.

At least certain ones of the channel-selection control signal values for application to the electrically tunable RF amplifier 12 are converted to analog signals applied to electrically selected or electrically tuned elements in the input coupling network to the RF amplifier input stage. This input coupling network provides RF selectivity that reduces the likelihood of the RF amplifier stage or frequency-conversion circuitry in the remote tuner 10 being overloaded by signals much larger than that of the DTV channel selected for reception. In some remote tuners further channel-selection control signal values for application to the electrically tunable RF amplifier 12 are converted to analog signals applied to electrically selected or electrically tuned elements in an output coupling network from the RF amplifier input stage to the mixer which follows the RF amplifier 12. In some inexpensive remote tuners the electrically tunable RF amplifier 12 is replaced by a non-tunable wideband RF amplifier or by a plurality of non-tunable sideband RF amplifiers.

The channel-selection control signal values for application to the electrically tuned local oscillator 14 control frequency scaling in an electrically tuned local oscillator 14 of frequency synthesizer type In some embodiments of the invention, the demodulator 24 also supplies the electrical control circuitry 25 with automatic-fine-tuning (AFT) signals in the form of a tone with analog amplitude modulation. The analog amplitude modulation of this tone is detected to recover AFT signal for application to the electrically tuned local oscillator 14, in addition to channel-selection control signal. The AFT signals originate from AFT circuitry in the indoor portion of the DTV receiver system, which AFT circuitry responds to the IF signal transmitted to it from the remote tuner 10 via the coaxial cable 20. In other embodiments of the invention, the remote tuner 10 will include its own AFT circuitry demodulation circuitry responding to IF output signal from the IF voltage amplifier 15.

One skilled in the art of TV receiver design knows that over-the-air terrestrial television broadcasting is done in the United States of America using 6-MHz-wide channels located in three discrete frequency ranges, as noted supra in the BACKGROUND OF INVENTION. The remote tuner 10 shown in FIG. 1 employs a single RF amplifier 12. Such a configuration is suitable for use in an area where only VHF signals are received, supposing the single RF amplifier 12 is specifically designed for VHF reception. Such a configuration is suitable for use in an area where only UHF signals are received, supposing the single RF amplifier 12 is specifically designed for UHF reception. In areas where both VHF and UHF signals are to be received, the remote tuner is likely to be modified so the font end circuitry for VF reception and the front end circuitry for UHF reception are at least to some extent separate from each other, in line with DTV receiver design practice customary up to this time Such modifications can be made without departing from the general precepts of the invention, as specifically embodied in the remote tuner 10 of FIG. 1.

Figure 2:
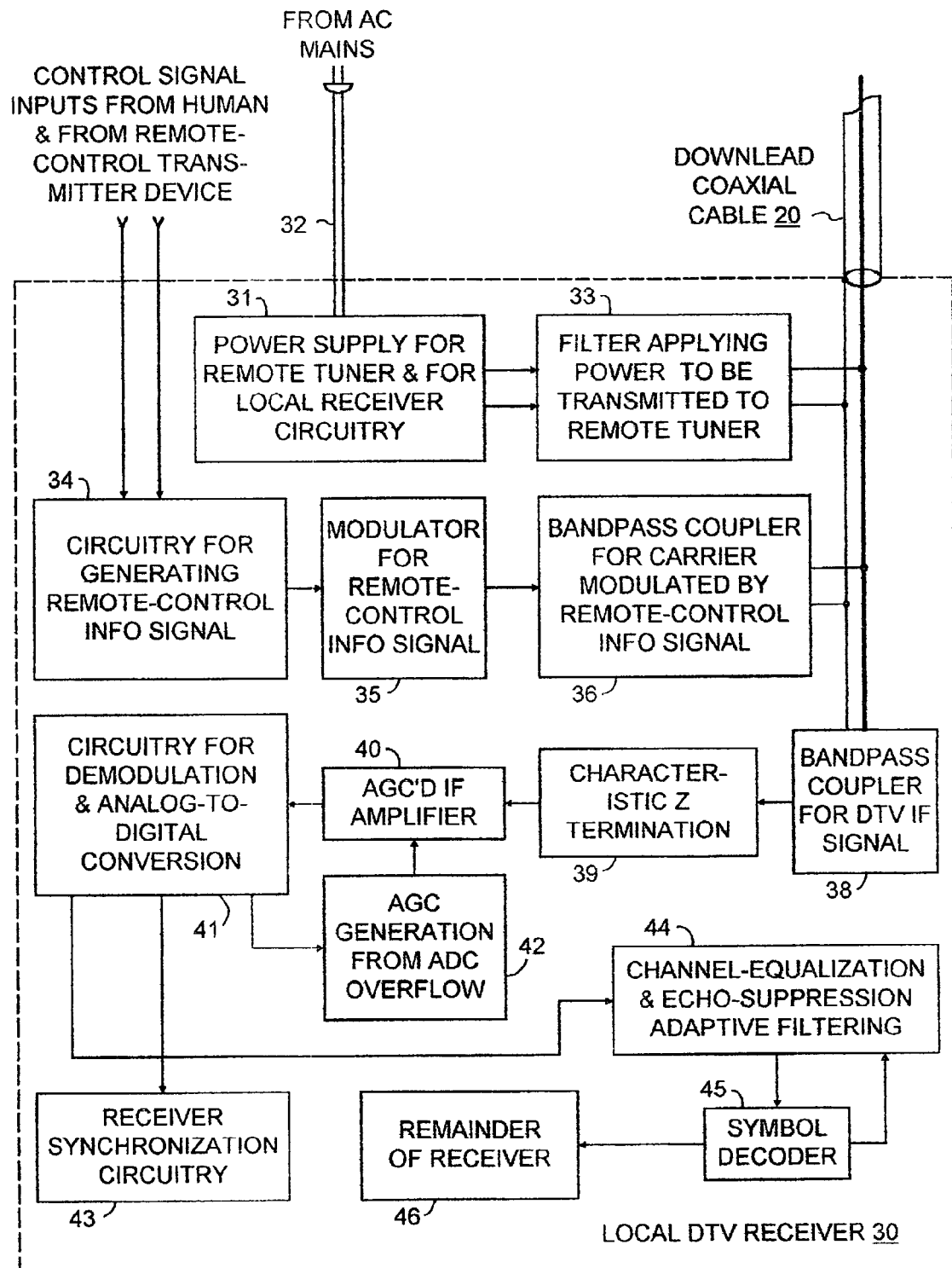
FIG. 2 is a schematic diagram of a special digital television receiver constructed without a local tuner and designed in accordance with the invention to receive and further process intermediate-frequency DTV signal supplied via the coaxial-cable downlead driven from the FIG. 1 remote tuner.

FIG. 2 shows a local DTV receiver 30 that the remote tuner 10 can be connected to via the coaxial cable 20. The local DTV receiver 30 contains a power supply 31 for itself and the remote tuner 10, which power supply 31 is equipped with a power cord 32 through which it receives power from the alternating-current mains. The power supply 31 supplies a filter 33 with power to be transmitted to the remote tuner 10 via the coaxial cable 20. The filter 33 includes a choke coil for passing direct-current or low-frequency alternating current from the power supply 31 to the center conductor of the coaxial cable 20 through which the current passes to power the remote turner 10. The choke coil in the filter 33 presents a high impedance to the center conductor of the coaxial cable 20 insofar as the IF signal supplied from the cable-driver amplifier 18 is concerned. The choke coil in the filter 33 also presents a high impedance to the center conductor of the coaxial cable 20 at frequencies where the cable 20 carries other signals in frequency multiplex with the IF signal supplied from the cable-driver amplifier 18. Each of the bandpass couplers 19, 22, 36, 38 usually includes a blocking capacitor in its connection to the center conductor of the coaxial cable 20, which blocking capacitor prevents flow of direct-current or low-frequency alternating current from the power supply 31 into the bandpass coupler.

The power supply 31 includes a power transformer with a primary winding to which the power cord 32 is connected and with a secondary winding for supplying alternating current transformed in voltage for rectification to generate direct-current power for the local DTV receiver 30. If the remote tuner 10 is designed to have direct-current power transmitted to it from the local DTV receiver 30, some of the direct-current power obtained through rectification is passed through the filter 33 to the center conductor of the coaxial cable 20. If the remote tuner 10 is designed to have alternating-current power transmitted to it from the local DTV receiver 30, the power transformer is provided with a tertiary winding grounded at one end and connected at the other end through the filter 33 to the center conductor of the coaxial cable 20.

The FIG. 2 local DTV receiver 30 includes circuitry 34 for generating a remote-control information signal applied to a modulator 35, which modulates a carrier in accordance with that signal to furnish a modulated carrier signal applied via a bandpass coupler 36 to the coaxial cable 20. The bandpass coupler 36 is a wideband filter, which can be constructed using inductors and capacitors, but can be more compactly constructed using ceramic resonator elements. The bandpass coupler 36 is transparent to the carrier signal modulated by the remote-control information signal, but presents a high impedance to the coaxial cable 20 at the low frequencies at which power is cabled up to the remote tuner 10 via the cable 20. This high impedance usually is owing to the inclusion of a blocking capacitor in the connection of the bandpass coupler 36 to the center conductor of the coaxial cable 20. The bandpass coupler 36 also presents high impedance to the coaxial cable 20 insofar as the IF signal supplied from the cable-driver amplifier 18 is concerned.

In the FIG. 2 local DTV receiver 30 the IF signal that the cable-driver amplifier 18 in the FIG. 1 remote tuner 10 applies to the coaxial cable 20 couples through a bandpass coupler 38 to a characteristic-impedance termination 39 for the cable 20. The cable 20 appears to the cable-driver amplifier 18 to be an infinite-length transmission line, since the characteristic-impedance termination 39 does not reflect the IF signal back to the amplifier 18. The characteristic-impedance termination 39 is essentially a pure resistance at IF and will in some embodiments of the local DTV receiver 30 essentially consist of a resistor. In usual practice, the reactive components in the bandpass coupler 38 provide tuning that negates the effects of stray reactance shunting the resistance of termination 39. The bandpass coupler 38 presents a high impedance to the coaxial cable 20 at the low frequencies at which power is cabled up to the remote tuner 10 via the cable 20. This high impedance usually is owing to the inclusion of a blocking capacitor in the connection of the bandpass coupler 38 to the center conductor of the coaxial cable 20. The bandpass coupler 19 also presents high impedance to the coaxial cable 20 insofar as the remote-control information signal supplied from the modulator 35 is concerned.

An automatically-gain-controlled intermediate-frequency amplifier 40 amplifies the IF signal appearing at the characteristic-impedance termination 39 before it is applied to demodulation and analog-to-digital conversion circuitry 41 as the input signal thereto. Circuitry 42 responds to overflow bits from the analog-to-digital conversion process to develop the automatic-gain-control (AGC) signal that regulates the voltage gain of the IF amplifier 40 so that the dynamic range of the analog-to-digital conversion process is well utilized. The demodulation and analog-to-digital conversion circuitry 41 can be either of the types previously used in DTV receivers. That is, the demodulation and analog-to-digital conversion circuitry 41 can be of the type in which the amplified IF signal from the IF amplifier 40 is digitized before being demodulated in the digital regime. Alternatively, the circuitry 41 can be of the type in which the amplified IF signal from the IF amplifier 40 is demodulated in the analog regime, and the resulting analog baseband DTV signal is then digitized Receiver synchronization circuitry 43 responds to the baseband DTV signal to perform receiver synchronization functions similarly to receiver synchronization circuitry previously used in DTV receivers. The receiver synchronization circuitry 43 regulates the rate of oscillations from a master clock oscillator to be a multiple of the baud rate of baseband DTV signal and counts those oscillations with counter circuitry. The receiver synchronization circuitry 43 extracts data segment synchronizing (DSS) signal and data field synchronizing (DFS) signal from the baseband DTV signal for synchronizing the count from that counter circuitry so specific values of the count correspond with certain portions of the DTV signal. So long as DTV signals are being received all digital functions of the DTV receiver are limed in accordance with oscillations from the master clock oscillator and with the count from counter circuitry counting those oscillations.

Adaptive filtering 44 responds to the digitized baseband DTV signal supplied from the demodulation and analog-to-digital conversion circuitry 41 and performs channel-equalization and echo-suppression procedures similar to those previously used in DTV receivers. The resulting equalized digitized baseband DTV signal is applied as input signal to a symbol decoder 45 that is connected to supply its symbol decoding results to the remainder portion 46 of the local DTV receiver 30, which remainder portion 46 is conventional in design. The symbol decoder 45 is a 12-phase trellis decoder presuming 8-VSB DTV signal is to be received. The symbol decoding results are customarily fed back from the symbol decoder 45 to the adaptive filtering 44, to furnish a basis from which to obtain estimates as to the symbols actually transmitted by the transmitter. These estimates are useful in decision-feedback algorithms for adapting the parameters of the adaptive filtering 44 and are useful in iterative filtering procedures that the adaptive filtering 44 may employ to suppress post-echoes.

Figure 3:
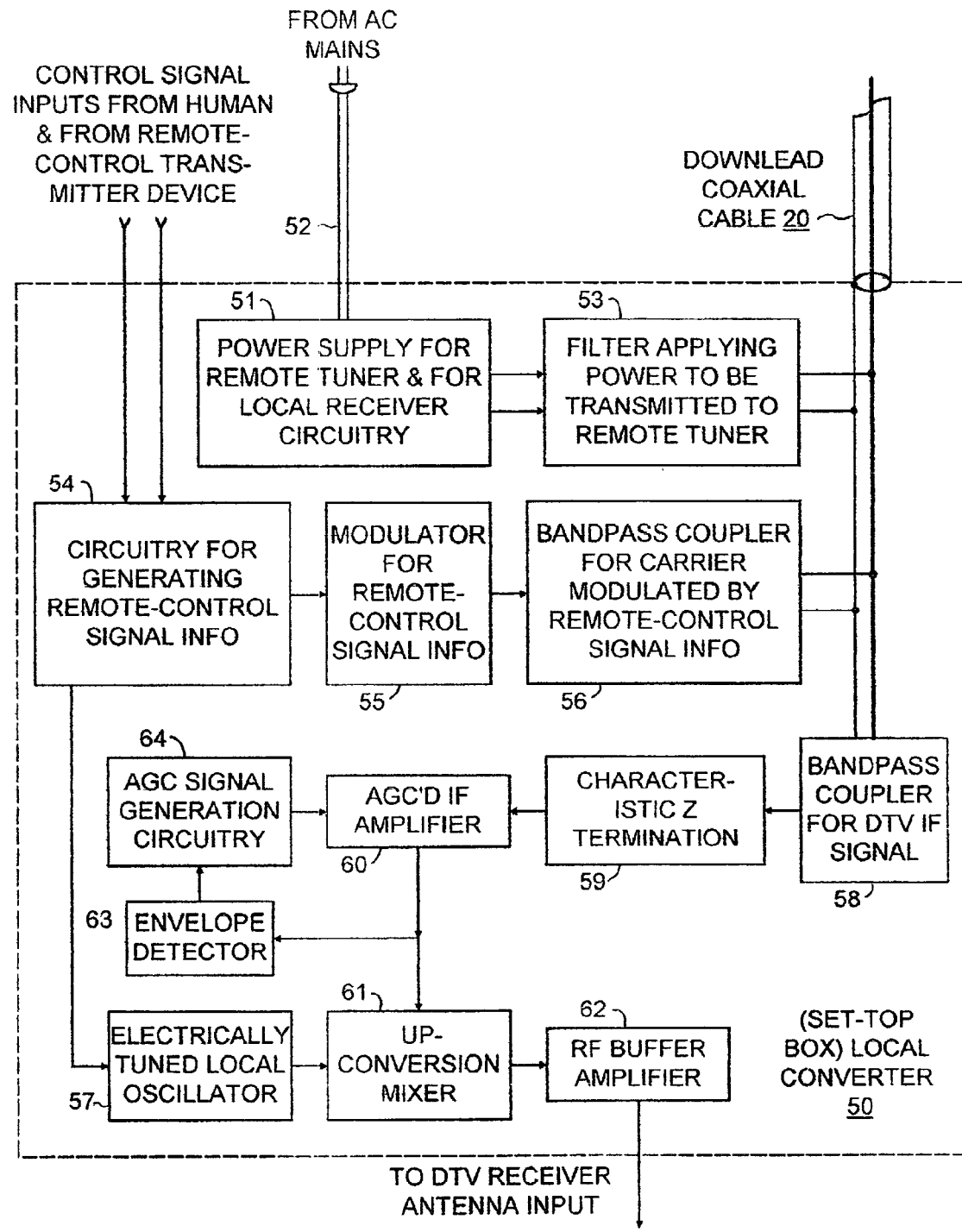
FIG. 3 is a schematic diagram of a local converter (or "set-top box") designed in accordance with the invention to receive intermediate-frequency DTV signal supplied via the coaxial-cable downlead driven from the FIG. 1 remote timer and to up-convert that intermediate-frequency DTV signal to a radio-frequency DTV signal for reception by a conventional digital television receiver.

While the local DTV receiver 30 shown in FIG. 2 uses adaptive filtering of digitized baseband DTV signal to effect channel-equalization and echo-suppression procedures, a local DTV receiver that instead uses adaptive filtering of intermediate-frequency DTV signal is an alternative embodiment of the invention. The techniques employed in such alternative adaptive filtering for channel-equalization and echo-suppression are described in U.S. Pat. No. 6,124,898 titled "DIGITAL TELEVISION RECEIVER WITH EQUALIZATION PERFORMED ON DIGITAL INTERMEDIATE-FREQUENCY SIGNALS", which issued 26, Sep. 2000 to C. B. Patel and A. L. R. Limberg. This specification and drawing will enable one of ordinary skill in the art of television receiver design and acquainted with U.S. Pat. No. 6,124,898 to design such alternative embodiment of the invention without undue experimentation and without exercise of independent inventive skill FIG. 3 shows a local converter 50 that will up-convert IF signal received from the remote tuner 10 via the coaxial cable 20, to generate RF DTV signals for application to a conventional DTV receiver. The local converter 50 is the type of apparatus sometimes referred to as a "set-top box".

The local converter 50 includes a power supply 51 for itself and the remote tuner 10, a power cord 52 for conducting primary power from the alternating current mains to its power supply 51, and a filter 53 for applying power from the power supply 51 to the center conductor of the coaxial cable 20 for transmission to the remote tuner 10. The power supply 51 and the filter 53 are similar in design to power supply 51 and the filter 53 in the FIG. 2 local DTV receiver 30.

The local converter 50 includes circuitry 54 for generating a remote-control information signal applied to a modulator 55, which modulates a carrier in accordance with that signal to furnish a modulated carrier signal applied via a bandpass coupler 56 to the coaxial cable 20. The modulator 55 and the bandpass coupler 56 are similar in design to the modulator 35 and the bandpass coupler 36 in the FIG. 2 local DTV receiver 30. The circuitry 54 for generating a remote-control information signal applied to the modulator 55 includes component circuitry essentially the same as the circuitry 34 in the FIG. 2 local DTV receiver 30 used for generating a remote-control information signal applied to the modulator 35. However, the circuitry 54 further includes additional component circuitry for generating channel-selection control signal values for application to an electrically controlled local oscillator 57 used in upconverting to TV broadcast frequencies the IF signal supplied to the local converter 50 from the remote tuner 10 via the coaxial cable 20.

In the FIG. 3 local converter 50 the IF signal that the cable-driver amplifier 18 in the FIG. 1 remote tuner 10 applies to the coaxial cable 20 couples through a bandpass coupler 58 to a characteristic-impedance termination 59 for the cable 20. The cable 20 appears to the cable-driver amplifier 18 to be an infinite-length transmission line, since the characteristic-impedance termination 59 does not reflect the IF signal back to the amplifier 18. The characteristic-impedance termination 59 is essentially a pure resistance at IF and will in some embodiments of the local converter 50 essentially consist of a resistor. In usual practice, the reactive components in the bandpass coupler 58 provide tuning that negates the effects of stray reactance shunting the resistance of termination 59. The IF signal appearing at the echo-free termination 59 is amplified by an automatically-gain-controlled intermediate-frequency amplifier 60 before being applied to an up-conversion, mixer 61 for heterodyning with oscillations from the electrically controlled local oscillator 57. The radio-frequency signal supplied from the mixer 61 as a result of the heterodyning is input signal for a radio-frequency buffer amplifier 62, which supplies the RF signal at low source impedance—e.g., 75 ohms—for application to the RF input connection of a conventional DTV receiver.

An envelope detector 63 is connected to receive the amplified IF signal supplied from the IF amplifier 60 and to detect its varying envelope. Automatic-gain-control signal generation circuitry 64 is connected to receive envelope detection results from the envelope detector 63. The AGC signal generation circuitry 64 peak detects the envelope detection results and lowpass filters the peak detection results to generate automatic-gain-control (AGC) signal for the IF amplifier 60. The voltage gain of the IF amplifier 60 is regulated responsive to the AGC signal so as to prevent overloading of the mixer 61.

The FIG. 3 local converter 50 may be designed so that the frequency of oscillations from the controlled local oscillator 57 can be programmed to cause the RF signal supplied from the RF buffer amplifier 62 to differ in frequency from the RF signal received at the outdoor antenna 5 of the FIG. 1 remote tuner 10. This design reduces the chance of strong DTV signals received by the DTV receiver directly via over-the-air transmission appearing as pre-echoes of the DTV signals received by the DTV receiver from the local converter 50

Figure 4:
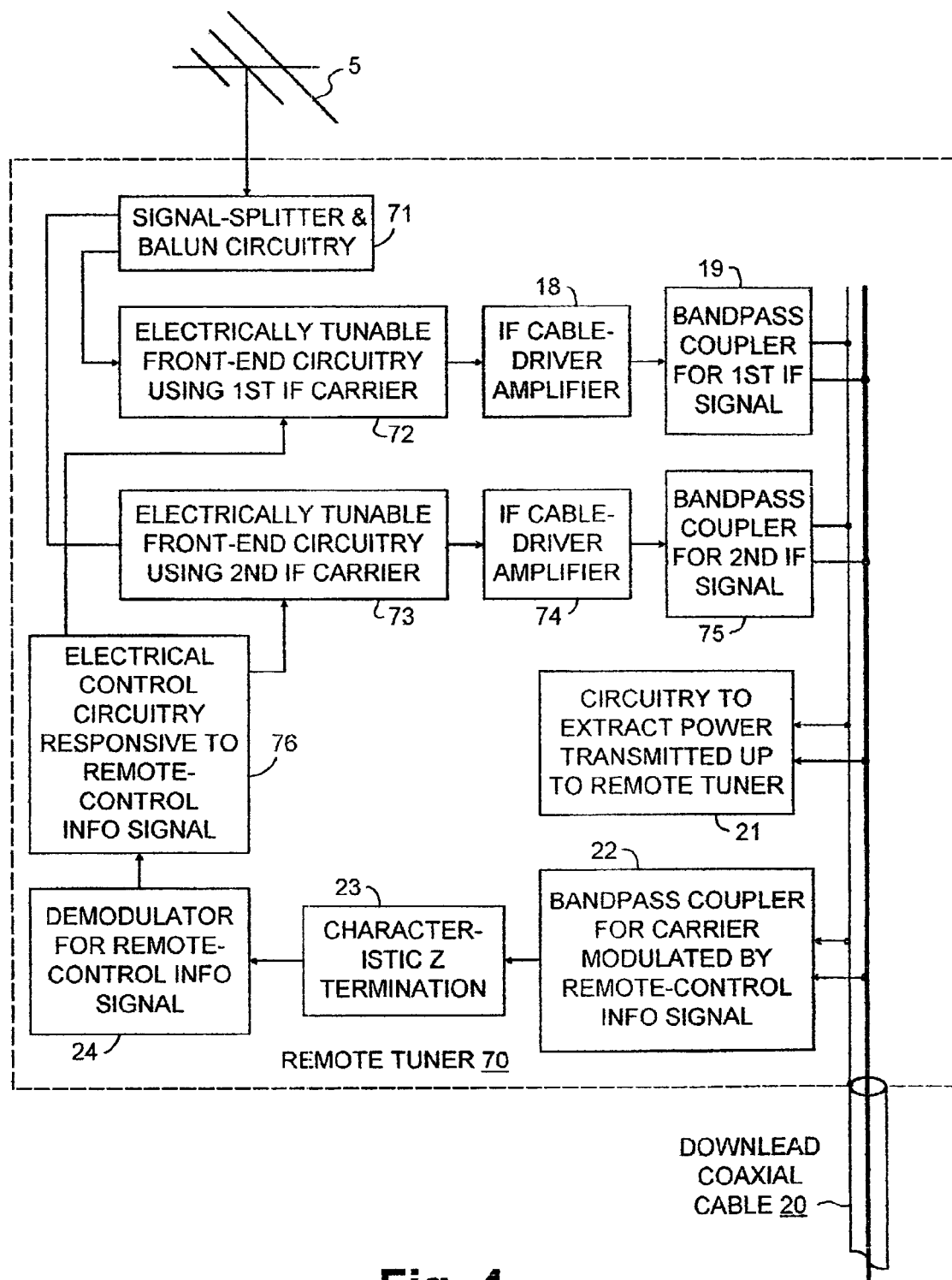
FIG. 4 is a schematic diagram of a remote tuner constructed in accordance with the invention for connection to a nearby outdoor antenna, and connected to a coaxial-cable downlead that the tuner drives with intermediate-frequency DTV signals downconverted from respective radio-frequency DTV signals selected for simultaneously being received.

FIG. 4 shows a remote tuner 70 capable of concurrently receiving I)TV signals transmitted over two different broadcast channels. Signal-splitter and balun circuitry split the response of an outdoor antenna into respective unbalanced radio-frequency input signals for electrically tunable front-end circuitry 72 and for electrically tunable front-end circuitry 73. The front-end circuitry 72 is similar to the front-end circuitry in the remote tuner 10 and supplies a first IF signal to the cable-driver amplifier 18. As shown in FIG. 1, this front-end circuitry comprises the electrically tunable RF amplifier 12, the frequency conversion circuitry 13, the electrically tuned local oscillator 14, the AGC'd IF voltage amplifier 15, the envelope detector 16 and the AGC signal generation circuitry 17. The amplified IF signal from the front-end circuitry 72 in the FIG. 4 remote tuner 70 has a first center frequency and is applied as input signal to the IF cable-driver amplifier 18. The cable-driver amplifier 18 amplifies the power of this IF signal in the FIG. 4 remote tuner 70, supplying it through the bandpass coupler 19 to the downlead coaxial cable 20.

The front-end circuitry 73 differs from the front-end circuitry 72 in that its frequency conversion circuitry causes an amplified second IF signal supplied from the front-end circuitry 73 to have a second center frequency differing from the first center frequency of the amplified first IF signal supplied from the front-end circuitry 72. The amplified IF signal from the front-end circuitry 73 is applied as input signal to an IF cable-driver amplifier 74, which amplifies the power of this IF signal as subsequently supplied through a bandpass coupler 75 to the downlead coaxial cable 20. The source impedance of the cable-driver amplifier 74 is not larger than being comparable with the characteristic impedance of the coaxial cable 20. The source impedance of the cable-driver amplifier 74 can be designed to be the characteristic impedance of the coaxial cable 20, to reduce the possibility of secondary reflections of the amplified IF signal in the cable 20. However, the cable-driver amplifier 74 can alternatively be designed to have source impedance lower than the characteristic impedance of the coaxial cable 20. The bandpass coupler 75 is a wideband filter that is transparent to the second IF signal supplied from the cable-driver amplifier 74, but presents high impedance at the low frequencies at which power is cabled up to the remote tuner 10 via the cable 20. The bandpass coupler 75 also presents high impedance to the coaxial cable 20 at intermediate frequencies in the first IF signal supplied from the cable-driver amplifier 18.

The remote tuner 70 of FIG. 4, like the remote tuner 10 of FIG. 1, includes circuitry 21 to extract the from the coaxial cable 20 direct-current or low-frequency alternating current power transmitted from an indoor location. The remote tuner 70 of FIG. 4 is also arranged like the remote tuner 10 of FIG. 1 insofar as receiving remote-control signals transmitted from the indoor location via the coaxial cable 20 is concerned. The bandpass coupler 22 is transparent to the carrier modulated with remote-control signal information, coupling it to the echo-free termination 23 for application as input signal to the demodulator 24. The demodulator 24 demodulates the carrier and supplies the demodulated remote-control signal information to electrical control circuitry 76. The electrical control circuitry 76 of FIG. 4 converts some of the demodulated remote-control signal information to control signals for the electrically tunable RF amplifier and for the electrically tuned local oscillator in the front-end circuitry 72, similarly to the way that this is done by the electrical control circuitry 25 in the remote tuner 10 of FIG. 1. However, the electrical control circuitry 76 of FIG. 4 additionally converts further demodulated remote-control signal information to control signals for the electrically tunable RF amplifier and for the electrically tuned local oscillator in the front-end circuitry 73.

Figure 5A:
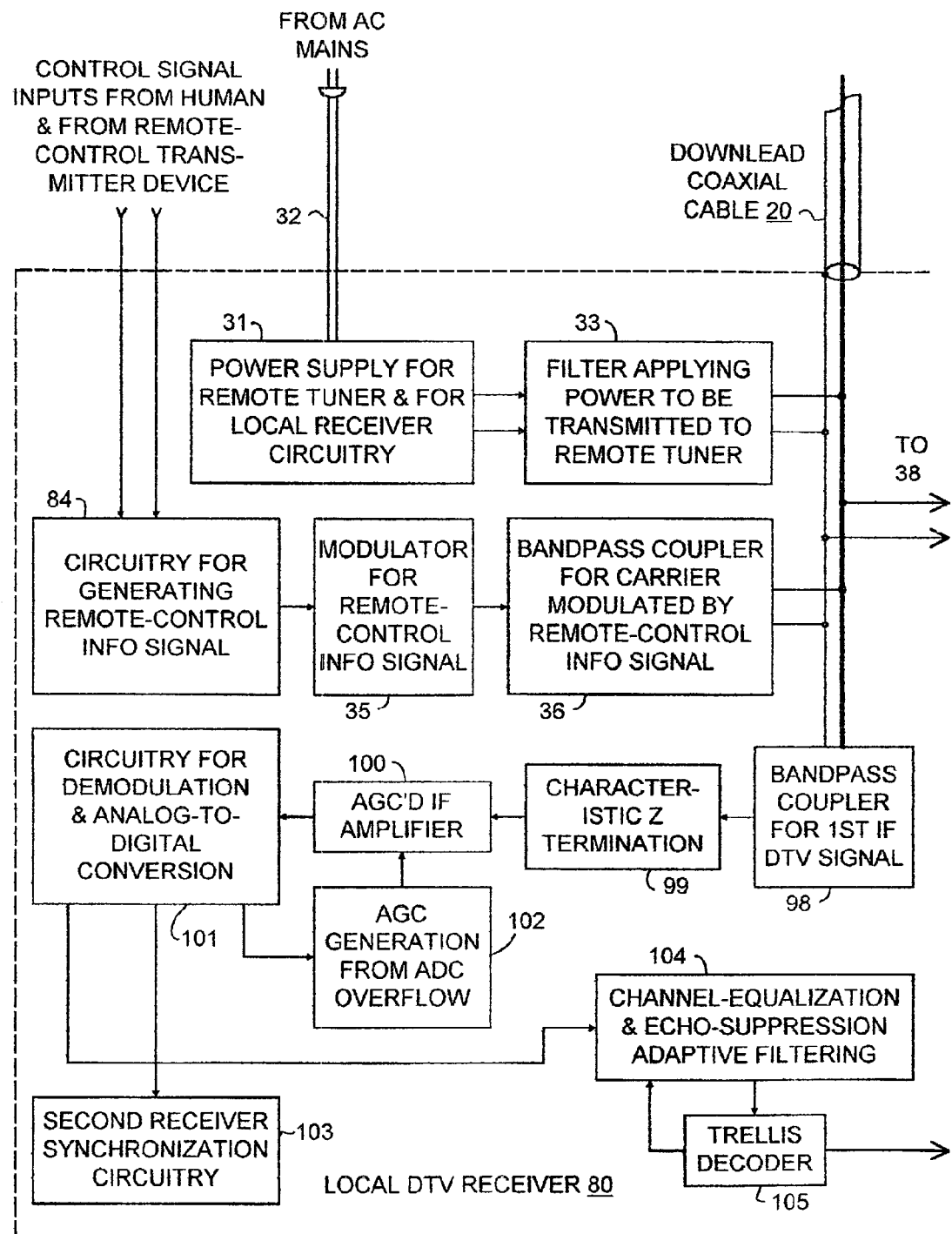
FIG. 5 is an assembly drawing showing the arrangement of FIGS. 5A, 5B and 5C to form a complete schematic diagram of a special digital television receiver constructed without a local tuner and designed in accordance with the invention to receive intermediate-frequency DTV signals simultaneously supplied via the coaxial-cable downlead driven from the FIG. 4 remote timer and to process those IF DTV signals for supporting a picture-in-picture display.
Figure 5:
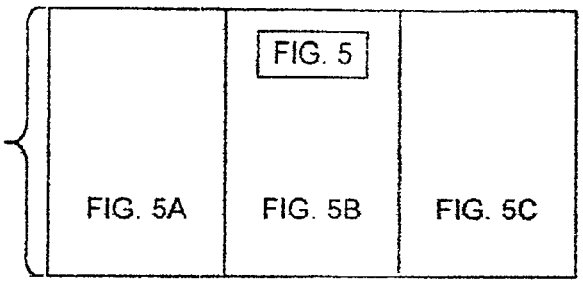
Figure 5B:
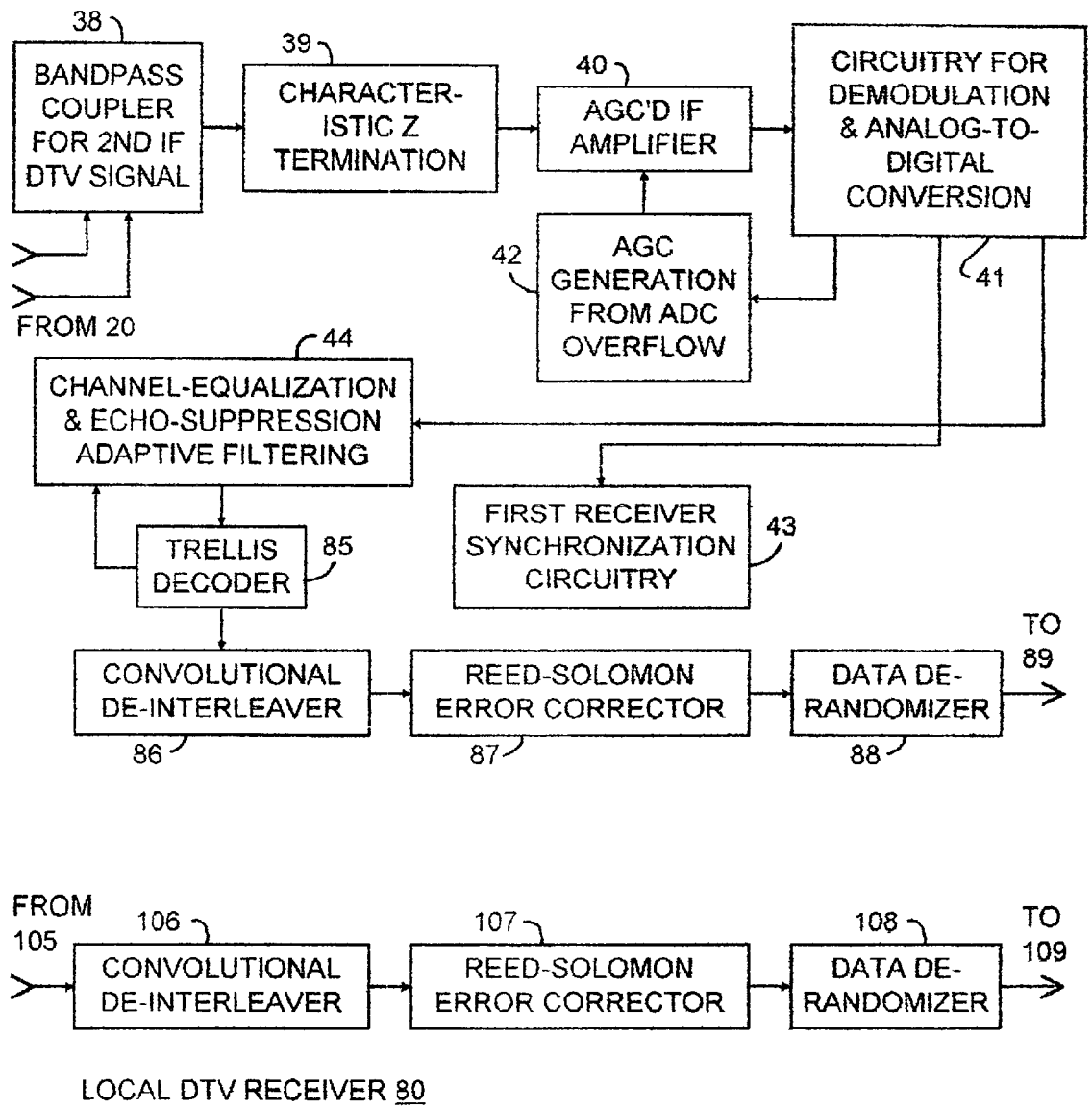
Figure 5C:
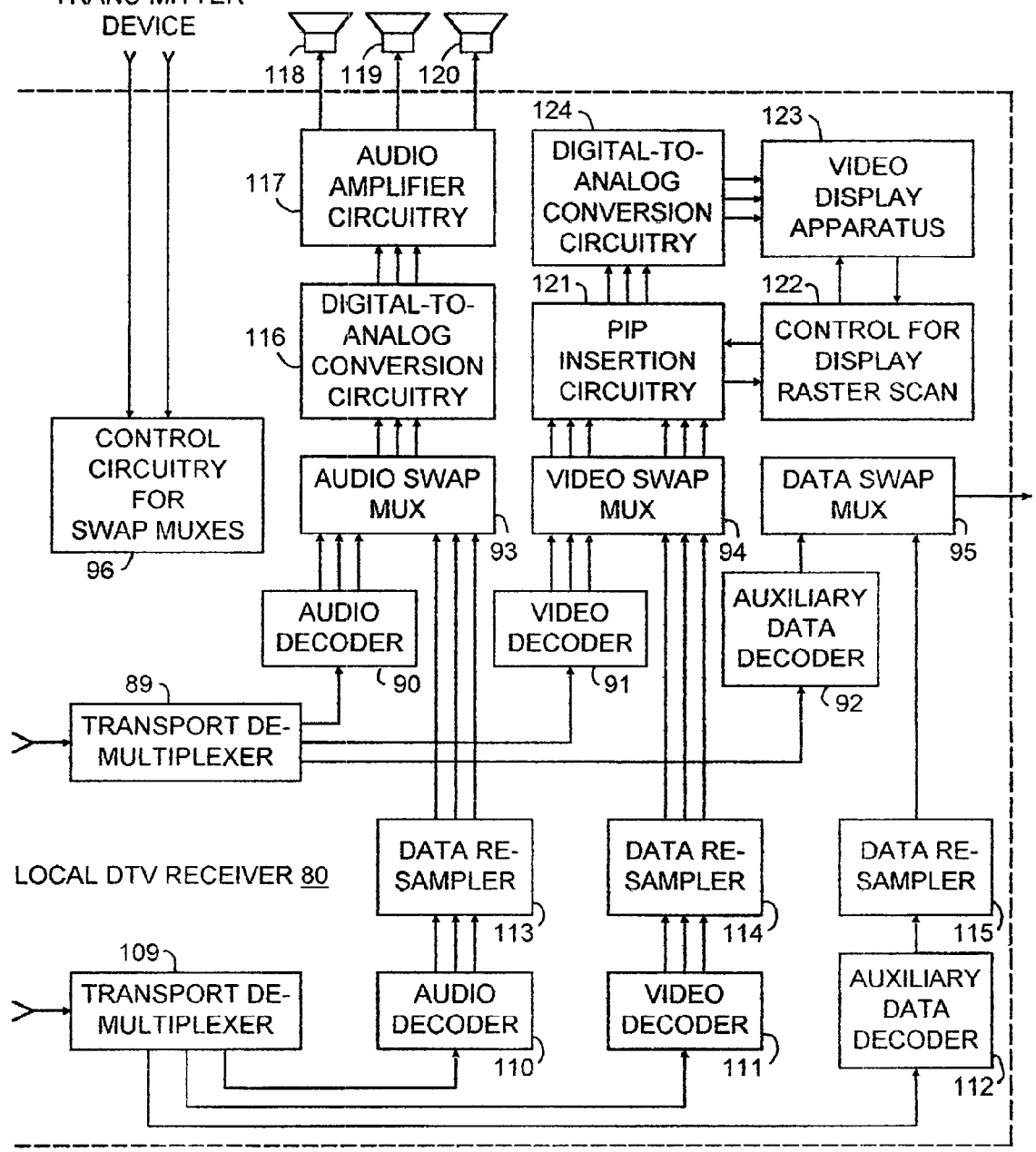

FIGS. 5A, 5B and 5C combine as shown in the FIG. 5 assembly figure to provide a schematic diagram of a local DTV receiver 80 designed for providing picture-in-picture (PIP) displays when receiving two DTV signals relayed from the remote tuner 70 of FIG. 4. FIG. 5A shows that, like the local DTV receiver 30 of FIG. 2, the local DTV receiver 80 includes the power supply 31 for itself and the remote tuner 70, the power cord 32 for conducting primary power from the alternating current mains to its power supply 31, and the filter 33 for applying power from the power supply 31 to the center conductor of the coaxial cable 20 for transmission to the remote tuner 70.

FIG. 5A shows that, like the local DTV receiver 30 of FIG. 2, the local DTV receiver 80 includes the modulator 35, which modulates a carrier in accordance with a remote-control information signal to furnish a modulated carrier signal applied via the bandpass coupler 36 to the coaxial cable 20. The circuitry 84 for generating a remote-control information signal applied to the modulator 35 includes components essentially the same as the circuitry 34 in the FIG. 2 local DTV receiver 30, which components are used for generating a remote-control information signal applied to the modulator 35 to be relayed via the coaxial cable 20 to the front-end circuitry 72 in the remote tuner 70. However, the circuitry 84 further includes additional components for generating remote-control information signal applied to the modulator 35 to be relayed via the coaxial cable 20 to the front-end circuitry 73 in the remote tuner 70.

FIG. 5B shows that the local DTV receiver 80 resembles the local DTV receiver 30 of FIG. 2 in other respects. The local DTV receiver 80 includes the bandpass coupler 38 for coupling the first IF signal with the first center frequency from the coaxial cable 20 to the characteristic-impedance termination 39. The IF signal appearing at the echo-free termination 39 is amplified by the AGC'd IF amplifier 40 before being applied as the input signal to the demodulation and ADC circuitry 41. The circuitry 42 responds to overflow bits from the analog-to-digital conversion process to develop the AGC signal that regulates the voltage gain of the IF amplifier 40 so that the dynamic range of the analog-to-digital conversion process in circuitry 41 is well utilized. First receiver synchronization circuitry 43 responds to the baseband DTV signal supplied from the demodulation and ADC circuitry 41 to perform receiver synchronization functions similarly to the receiver synchronization circuitry previously used in DTV receivers. The adaptive filtering 44 in the local DTV receiver 80 responds to the digitized baseband DTV signal supplied from the demodulation and ADC circuitry 41 and performs channel-equalization and echo-suppression procedures similar to those previously used in DTV receivers. The resulting equalized digitized baseband DTV signal is applied as input signal to a trellis decoder 85 that performs the symbol decoding function. The trellis decoder 85 is the customary 12-phase type presuming 8-VSB DTV signal is to be received. The symbol decoding results are, per customary practice, fed back from the trellis decoder 85 to the adaptive filtering 44, to furnish a basis from which to obtain estimates as to the symbols actually transmitted by the transmitter. These estimates are useful in decision-feedback algorithms for adapting the parameters of the adaptive filtering 44 and are useful in iterative filtering procedures that the adaptive filtering 44 may employ to suppress post-echoes.

FIG. 5B shows a convolutional de-interleaver 86 connected to receive trellis decoding results from the trellis decoder 85 and to supply de-interleaved trellis decoding results to Reed-Solomon error-corrector 87. The Reed-Solomon error-corrector 87 is connected to supply error-corrected de-interleaved trellis decoding results to a data de-randomizer 88, which reproduces the data packets originally supplied to the DTV transmitter.

The data de-randomizer 88 connects to a transport de-multiplexer 89 shown in FIG. 5C, which de-multiplexer 89 sorts packets of data in accordance with a packet identification (PID) code within each packet. The transport de-multiplexer 89 directs audio data packets to an audio decoder 90 and directs video data packets to a video decoder 91. The transport de-multiplexer 89 directs auxiliary data packets to an auxiliary data decoder 92, which deletes PID codes from the data and assembles the remaining data into a continuous data stream. The trellis decoder 85, the convolutional de-interleaver 86, the Reed-Solomon error-corrector 87, the data de-randomizer 88, the transport de-multiplexer 89, the audio decoder 90, the video decoder 91 and the auxiliary data decoder 92 are conventional in their structures, connections and operations. To receive signals transmitted in accordance with the current United States DTV broadcast standard, the audio decoder 90 is of AC-3 type, and the video decoder 91 is of MPEG-2 type.

The left-channel, right-channel and low-frequency-enhancement digital audio signals from the audio decoder 90 are supplied to an audio swap multiplexer 93 as a first set of digitized audio signals that the multiplexer 93 can select for being reproduced as its output signal. The red-drive, green-drive and blue-drive digital video signals from the video decoder 91 are supplied to a video swap multiplexer 94 as a first set of digitized audio streams that the multiplexer 94 can select for being reproduced as its output signal. The data from the auxiliary data decoder 92 are supplied to a data swap multiplexer 95 as a first set of data that the multiplexer 95 can select for being reproduced as its output signal. The selections by the audio swap multiplexer 93, by the video swap multiplexer 94 and by the data swap multiplexer 95 are made responsive to control signals from control circuitry 96 for the swap multiplexers 93, 94 and 95. The connections for these control signals are omitted from FIG. 5C to avoid confusing a person viewing the drawing. The control circuitry 96 is arranged to receive swap instructions from a control panel of the local DTV receiver 80 with switches that are actuated by a human being. The control circuitry 96 is further arranged to receive swap instructions relayed from a receiver for transmissions from a remote controller with switches that are actuated by a human being.

FIG. 5A shows a bandpass coupler 98 included in the local DTV receiver 80 for coupling the second IF signal with the second center frequency from the coaxial cable to a characteristic-impedance termination 99 for the cable 20. The cable 20 appears to the cable-driver amplifier 74 to be an infinite-length transmission line, since the characteristic-impedance termination 99 does not reflect the IF signal back to the amplifier 74 in the FIG. 4 remote tuner 70. The characteristic-impedance termination 99 is essentially a pure resistance at the second IF signal frequencies and will in some embodiments of the local DTV receiver 80 essentially consist of a resistor. In usual practice the reactive components in the bandpass coupler 98 provide tuning that negates the effects of stray reactance shunting the resistance of termination 99. The IF signal appearing at the echo-free termination 99 is amplified by an intermediate-frequency amplifier 100 before being applied to demodulation and analog-to-digital circuitry 101 as its input signal. Circuitry 102 responds to overflow bits from the analog-to-digital conversion process to develop the AGC signal that regulates the voltage gain of the IF amplifier 100 so that the dynamic range of the analog-to-digital conversion process in circuitry 101 is well utilized. Second receiver synchronization circuitry 103 responds to the baseband DTV signal supplied from the demodulation and ADC circuitry 101 to perform receiver synchronization functions similarly to first receiver synchronization circuitry 43. Adaptive filtering 104, similar in construction and operation to the adaptive filtering 44, responds to the digitized baseband DTV signal supplied from the demodulation and ADC circuitry 101 and performs channel-equalization and echo-suppression. The resulting equalized digitized baseband DTV signal is applied as input signal to a trellis decoder 105 that performs the symbol decoding function. The trellis decoder 105 is the customary 12-phase type, presuming 8-VSB DTV signal is to be received. The symbol decoding results are, per customary practice, fed back from the trellis decoder 105 to the adaptive filtering 104, to furnish a basis from which to obtain estimates as to the symbols actually transmitted by the transmitter. These estimate are useful in decision-feedback algorithms for adapting the parameters of the adaptive filtering 104 and are useful in iterative filtering procedures that the adaptive filtering 104 may employ to suppress post-echoes.

FIG. 5B shows a convolutional de-interleaver 106 connected to receive trellis decoding results from the trellis decoder 105 and to supply de-interleaved trellis decoding results to Reed-Solomon error-corrector 107. The Reed-Solomon error-corrector 107 is connected to supply error-corrected de-interleaved trellis decoding results to a data de-randomizer 108, which reproduces the data packets originally supplied to the DTV transmitter.

The data de-randomizer 108 connects to a transport de-multiplexer 109 shown in FIG. 5C, which de-multiplexer 109 sorts packets of data in accordance with a packet identification code (PID) within each packet. The transport de-multiplexer 109 directs audio data packets to an audio decoder 110, similar in construction and operation to the audio decoder 90, and directs video data packets to a video decoder 111, similar in construction and operation to the video decoder 91. The transport de-multiplexer 109 directs auxiliary data packets to an auxiliary data decoder 112, similar in construction and operation to the auxiliary data decoder 92.

FIG. 5C shows output connections of the audio decoder 110, the video decoder 111 and the auxiliary data decoder 112 to data re-samplers 113, 114 and 115, respectively. The data re-sampler 113 re-samples the left-channel, right-channel and low-frequency-enhancement digital audio signals from the audio decoder 110, sampled according to the clock in the second receiver synchronization circuitry 103, to generate left-channel, right-channel and low-frequency-enhancement digital audio signals sampled according to the clock in the first receiver synchronization circuitry 43, which signals are supplied to the audio swap multiplexer 93 as a second set of digitized audio signals that the multiplexer 93 can select for being reproduced as its output signal. The data re-sampler 114 re-samples the red-drive, green-drive and blue-drive digital video signals from the video decoder 111, sampled according to the clock in the second receiver synchronization circuitry 103, to generate red-drive, green-drive and blue-drive digital video signals sampled according to the clock in the first receiver synchronization circuitry 43, which signals are supplied to the video swap multiplexer 94 as a second set of digitized video signals that the multiplexer 94 can select for being reproduced as its output signal. The data re-sampler 115 re-samples the data from the auxiliary data decoder 112, sampled according to the clock in the second receiver synchronization circuitry 103, to generate data sampled according to the clock in the first receiver synchronization circuitry 43, which data are supplied to the data swap multiplexer 95 as a second set of data that the multiplexer 95 can select to reproduce as its output signal. FIG. 5C shows the data swap multiplexer 95 output signal being made available outside the local DTV receiver 80 for connection to an unspecified data processing device.

Digital-to-analog conversion circuitry 116 is connected to receive the left-channel, right-channel and low-frequency-enhancement digital audio signals that the audio swap multiplexer 93 selects to reproduce sound. The digital-to-analog conversion circuitry 116 converts these digital audio signals to left-channel, right-channel and low-frequency-enhancement analog audio signals supplied to audio amplifier circuitry 117. The audio amplifier circuitry 117 includes respective amplifiers for amplifying these left-channel, low-frequency-enhancement, and right-channel analog audio signals for application to loudspeakers 118, 119 and 120.

Picture-in-picture insertion circuitry 121 receives two sets of red-drive, green-drive and blue-drive digital video signals from the video swap multiplexer 94. The video swap multiplexer 94 selects which of these first and second sets of digital video signals is to be used as the main picture filling the principal portion of the viewscreen and which of these first and second sets of digital video signals is to be used as the reduced-size picture to be inserted into the main picture. The PIP insertion circuitry 121 is controlled by control circuitry 122 for the display raster scan, which control circuitry 122 also controls the scanning of the display raster on the viewscreen of a video display apparatus 123 included in the local DTV receiver 80.

Digital-to-analog conversion circuitry 124 is connected for receiving the picture-in-picture red-drive, green-drive and blue-drive digital video signals supplied from the PIP insertion circuitry 121. The DAC circuitry 124 is operated for converting those digital video signals to picture-in-picture red-drive, green-drive and blue-drive analog video signals. The DAC circuitry 124 is connected for supplying these analog video signals to the video display apparatus 123.

Various forms that the PIP insertion circuitry 121 can take are known in the prior art. By way of specific example, the PIP insertion circuitry 121 can include digital data frame stores both for the main display information and for the PIP display information. The digital data frame store for the PIP display information may of banked construction, so that a number of spatially contiguous samples in each of the red-drive, green-drive and blue-drive digital video signals can be made simultaneously available, to be used for re-sampling the PIP display information to generate digital video signals descriptive of a lower-spatial-resolution, smaller-size raster. The re-sampled PIP display information can then be used for over-writing a portion of the contents of the digital data frame store for the main display information, thereby inserting the PIP information into the contents of the digital data frame store for the main display information before its being read to the DAC circuitry 124.

The remote tuner 70 of FIG. 4 and its companion local DTV receiver 80 provide for the simultaneous reception of two DTV channels and the insertion of the picture received over either of the channels into the picture received over the other of the channels. Remote tuners that provide for the simultaneous reception of an even larger number of DTV channels can be constructed in accordance with the precepts of the invention here described. Companion local DTV receivers for such remote tuners can also be constructed in accordance with the precepts of the invention here described. Such a local DTV receiver selects one of the simultaneously received DTV signals to supply sound and the main displayed information. The receiver has capability for selecting one or more of the others of these DTV signals for picture-in-picture display, with a wide variety of swapping features being possible. Variants of the invention which admit some of the received signals being analog television signals—e.g., of NTSC type—are easily constructed, also, by one skilled in the art of television receiver design and acquainted with the contents of this specification and its accompanying drawing.

The choice of center frequencies for the first and second IF signals is a matter that deserves careful attention. The first center frequency of the first IF signal can be 44 MHz, for example, per custom. Presuming the first and second IF signals are frequency multiplexed on the cable 20, the second center frequency of the second IF signal is preferably higher or lower by 10 MHz or so than the first center frequency of the first IF signal, so that adjacent channel signal accompanying either IF signal does not interfere with the other IF signal.

If the front-end circuitry 72 and the front-end circuitry 73 each employ double-conversion, image rejection is not a problem. Accordingly, the second center frequency of the second IF signal can be as low as 18 MHz so that any second harmonics of the second IF signal will not interfere with the first IF signal. The narrow bandwidth of the carrier modulated width remote-control information signal facilitates this carrier being chosen at still lower frequency.

Figure 6:
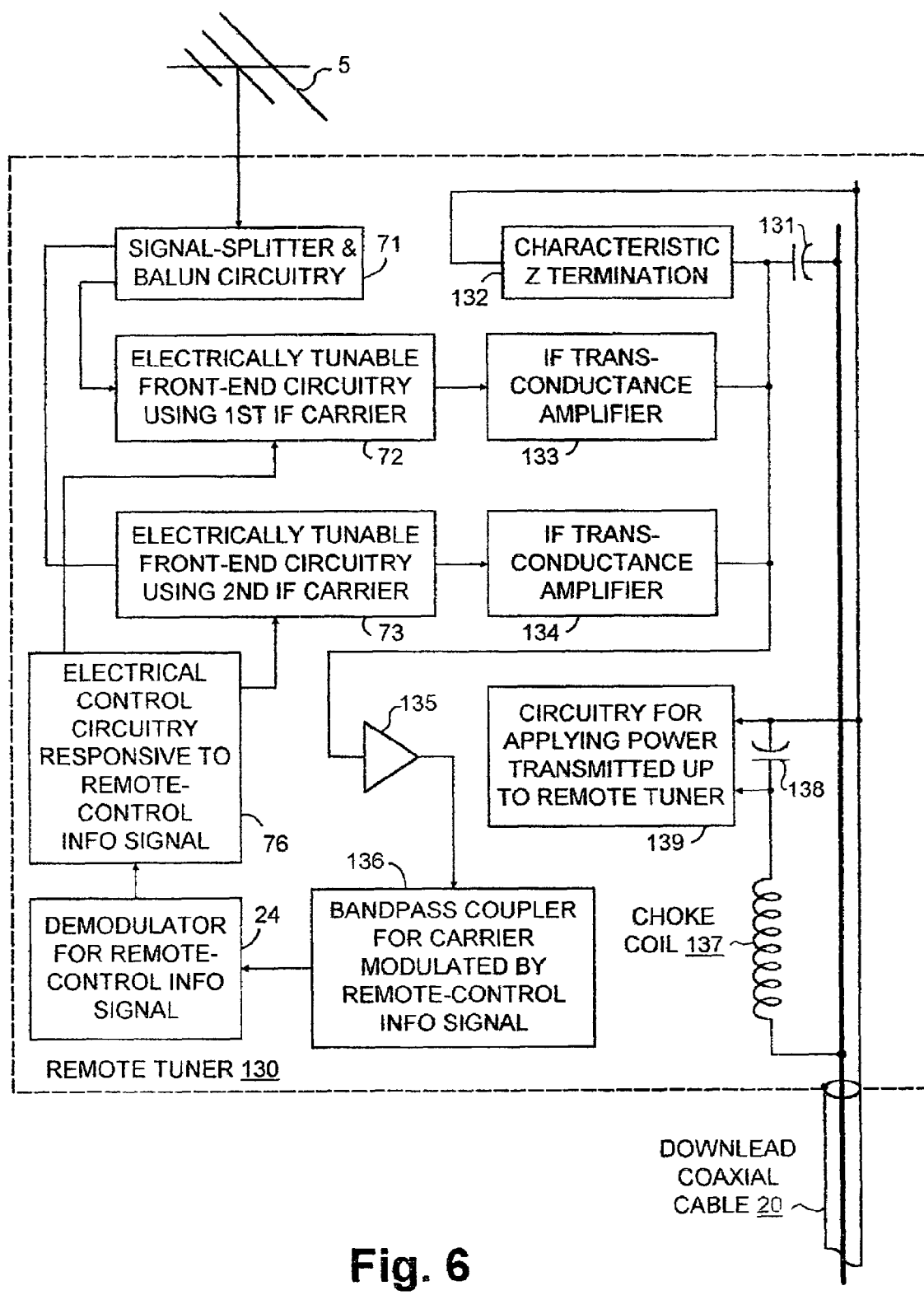
FIG. 6 is a schematic diagram of a remote tuner connected to a coaxial-cable downlead that the tuner drives with intermediate-frequency DTV signals downconverted from respective radio-frequency DTV signals selected for simultaneously being received, the remote tuner shown in FIG. 6 being constructed in accordance with the invention but somewhat differently than the remote tuner shown in FIG. 4.
Figure 7A:
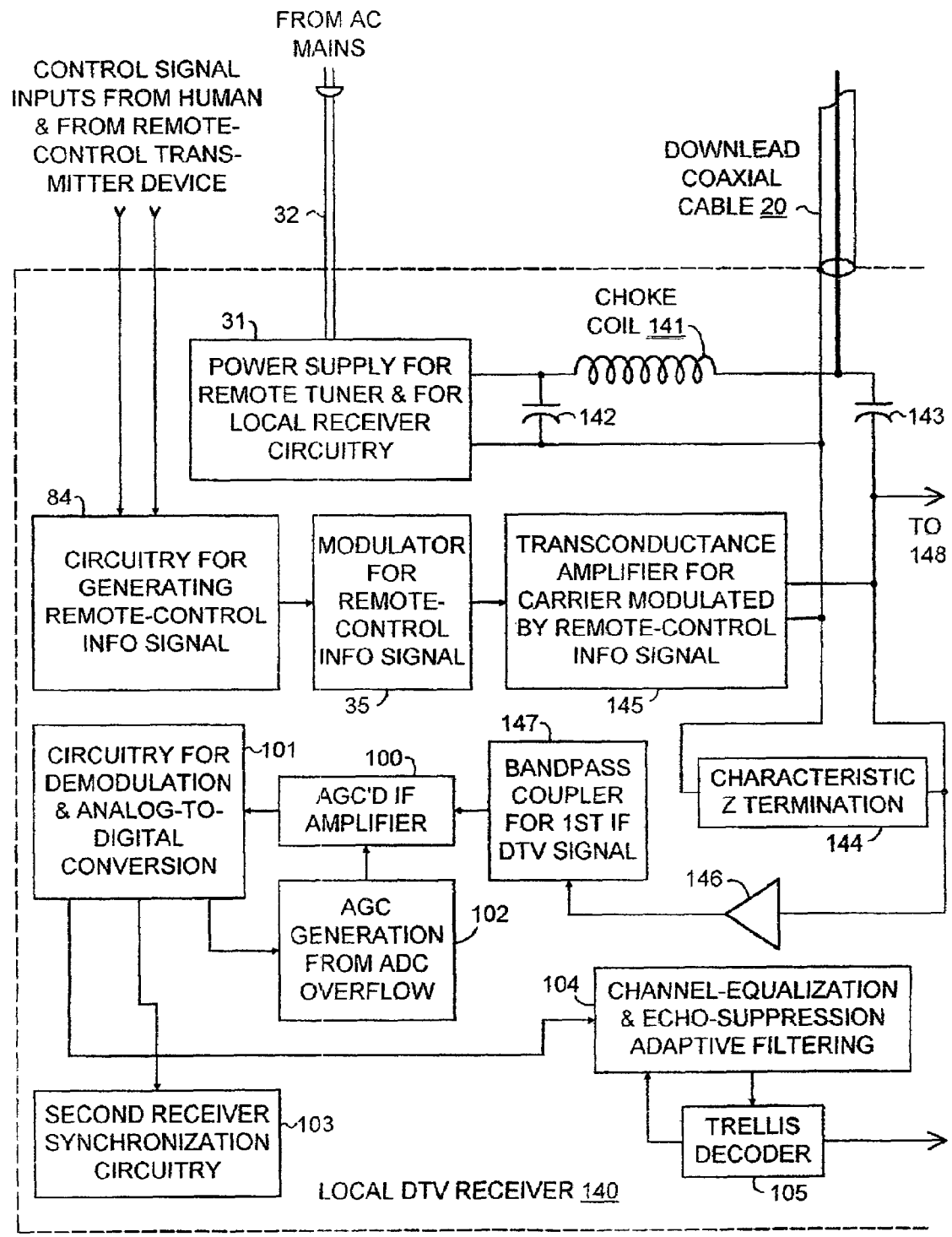
FIG. 7 is an assembly drawing showing the arrangement of FIGS. 7A, 7B and 7C to form a complete schematic diagram of a special digital television receiver constructed without a local tuner and designed in accordance with the invention to receive intermediate-frequency DTV signals simultaneously supplied via the coaxial-cable downlead driven from the FIG. 6 remote tuner and to process those IF DTV signals for supporting a picture-in-picture display.
Figure 7B:
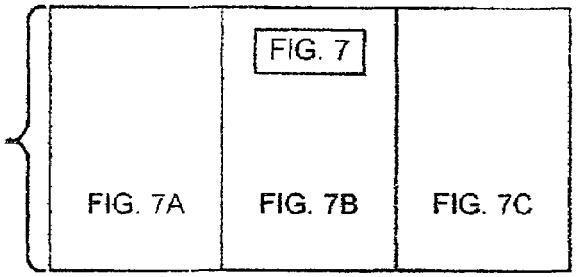
Figure 7B:
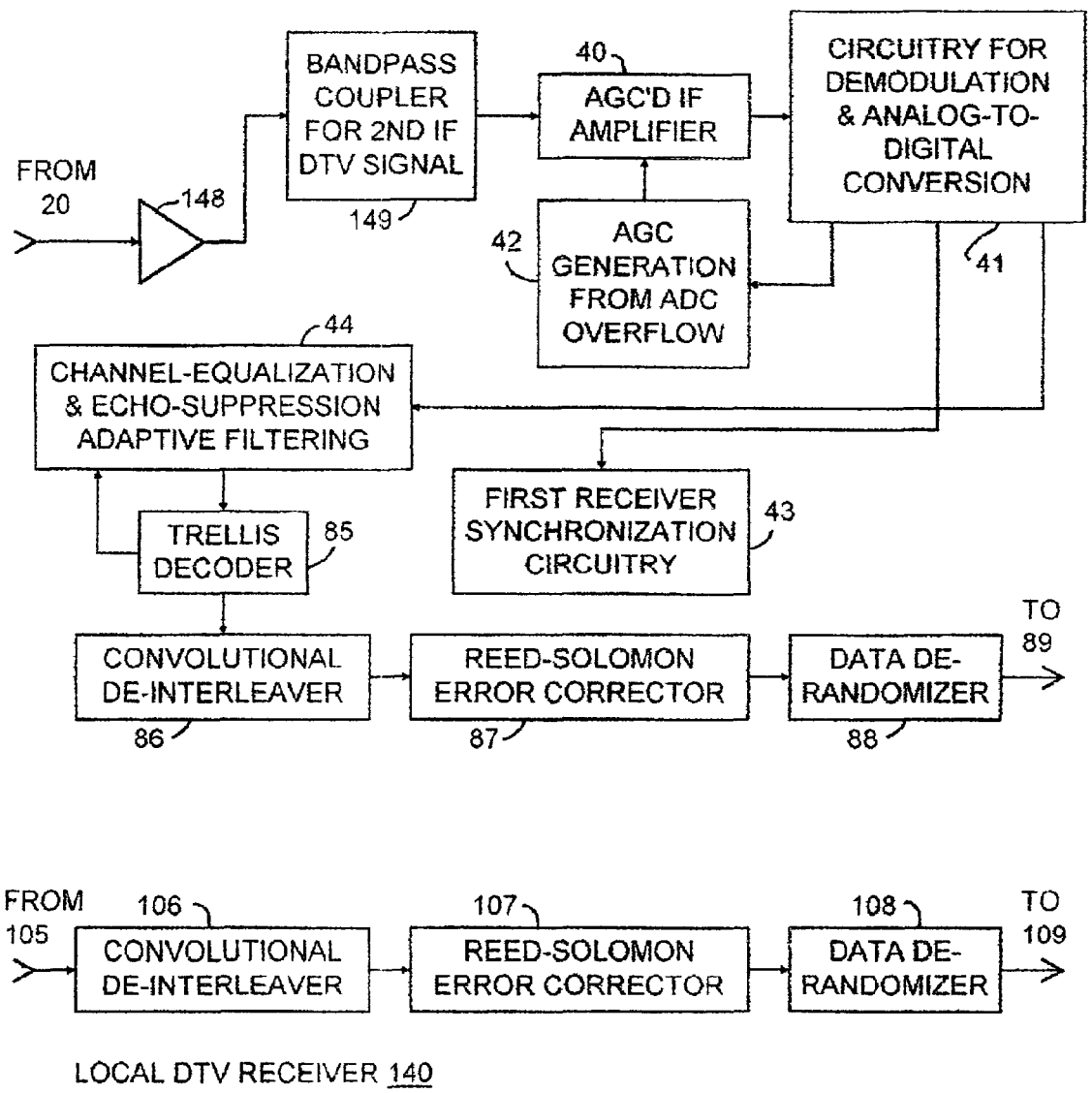
Figure 7C:
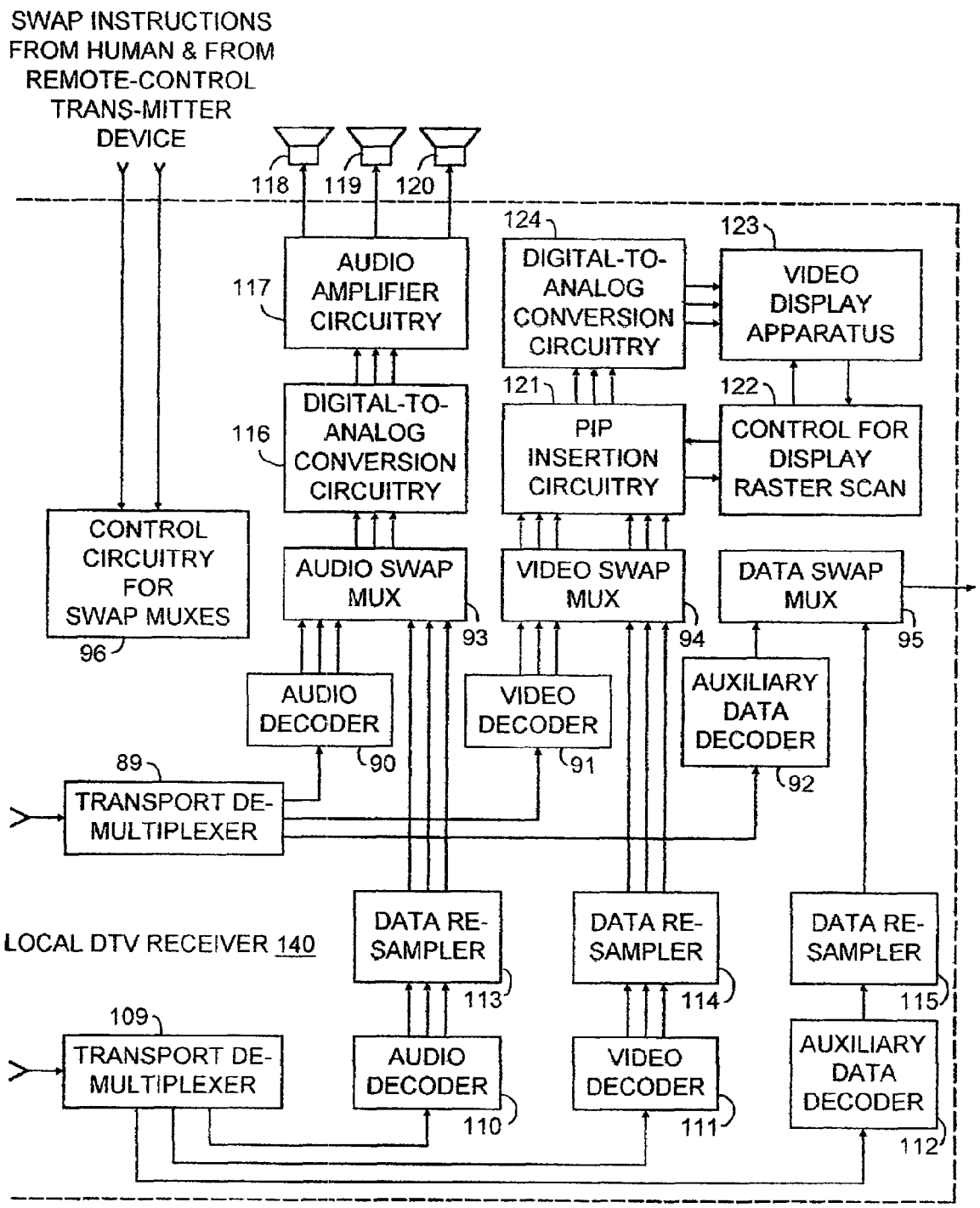

A design problem in the system comprising the remote tuner 70 and the local DTV receiver 90 is designing the bandpass couplers so as not to affect each other. This problem becomes more difficult when a number of different intermediate-frequency signals are required and when one wishes to space these different intermediate-frequency signals not too far apart in the frequency spectrum. The system comprising the remote tuner of FIG. 6 and the local DTV receiver of FIGS. 7A, 7B and 7C provides a solution to this design problem FIG. 6 shows a remote tuner 130 that is a modification of the remote tuner 70 shown in FIG. 4. The remote tuner 130 also drives the coaxial-cable downlead 20 with IF DTV signals down converted from respective RF DTV signals selected for simultaneous reception, but does not have bandpass couplers 19 and 75 for applying the plural IF signals to the coaxial cable 20. The center conductor of the coaxial cable 20 is coupled through a capacitor 131 to a characteristic-impedance termination 132 for the coaxial cable 20. This characteristic-impedance termination 132 can simply be a resistor. The cable-drive amplifiers 18 and 74 are replaced in remote tuner 130 by transconductance amplifiers 133 and 134, respectively, which share the characteristic-impedance termination 132 as a common load impedance. The voltage appearing across the termination 132 includes a first IF signal component responsive to a first portion of the output current of the transconductance amplifier 133 flowing in response to the first IF signal voltage from the front-end circuitry 72, a second IF signal component responsive to a first portion of the output current of the transconductance amplifier 134 flowing in response to the second IF signal voltage from the front-end circuitry 73, and a further component, which is a carrier modulated by remote-control information signal. The capacitor 131 is a blocking capacitor for d-c power or low-frequency a-c power transmitted up to the remote tuner 130 from the local DTV receiver located indoors. A buffer amplifier 135 applies the voltage across the characteristic-impedance termination 132 to a bandpass coupler 136 for the carrier modulated by remote-control information signal, to be coupled to the input of the demodulator 24. The buffer amplifier 135 is preferably of such design its input port presents very low shunt capacitance to the characteristic-impedance termination 132. For example, neutralization of the buffer amplifier 135 using Miller feedback is a technique for reducing the shunt capacitance its input port offers.

The bandpass coupler 22 and the characteristic-impedance termination 23 of the FIG. 4 remote tuner 70 are not included in the remote tuner 130. The bandpass coupler 136 provides the selectivity for the carrier modulated by remote-control information signal that the bandpass coupler 22 provides in remote tuner 70.

The circuitry 22 of the remote tuner 70 is shown more explicitly in the FIG. 6 remote tuner 130, as including a series-arm choke coil 137 and a shunt-leg bypass capacitor 138 for the IF signals and for the carrier modulated by remote-control information signal. This filter arrangement conducts the d-c power or low-frequency a-c power transmitted from the local DTV receiver to circuitry 139 for applying that power as operating power to the elements of the remote tuner 130, but prevents the flow of currents to the circuitry 139 responsive to the IF signals or the carrier modulated by remote-control information signal.

FIGS. 7A, 7B and 7C combine as shown in the FIG. 7 assembly figure to provide a schematic diagram of a local DTV receiver 140 designed for providing picture-in-picture (PIP) displays when receiving two DTV signals relayed from the remote tuner 130 of FIG. 6. The local DTV receiver 140 is a modification of the local DTV receiver 90 of FIGS. 5A, 5B and 5C.

The portion of the local DTV receiver 140 shown in FIG. 7C is identical to the portion of the local DTV receiver 90 shown in FIG. 5C. The description of FIG. 5C describes the audio decoders 90 and 110 each recovering just left-channel, right-channel and low-frequency-enhancement signals. However, the AC-3 coding system incorporated in A/53 provides for transmission of as many as five independent full-bandwidth audio channels in addition to the lower-bandwidth channel for low-frequency-enhancement signals. The audio decoders 90 and 110, the audio swap multiplexer 93, the digital-to-analog conversion circuitry 116, and the audio amplifier circuitry 117 will in some DTV receiver designs be capable of driving not only loudspeakers 118, 119 and 120, but additional loudspeakers as well. The description is limited to describing only three loudspeakers 118, 119 and 120 primarily because of space limitations in FIGS. 5C and 7C of the drawing.

The filter 33 of the local DTV receiver 140 is shown more explicitly in the FIG. 7A, as including a series-arm choke coil 141 and a shunt-leg capacitor 142 for the IF signals and for the carrier modulated by remote-control information signal. This series-arm choke coil 141 conducts d-c power or low-frequency a-c power from the power supply 33 to the coaxial cable 20 for transmission up to the remote tuner 130. The capacitor bypasses the power supply 33 insofar as an IF signal or the carrier modulated by remote-control information signal is concerned.

The portion of the local DTV receiver 140 shown in FIG. 7A differs in the following respects from the portion of the local DTV receiver 90 shown in FIG. 5A. The bandpass couplers 36, 38 and 98 are omitted in the local DTV receiver 140. So are the characteristic-impedance terminations 39 and 99. The center conductor of the coaxial cable 20 is coupled through a capacitor 143 to a characteristic-impedance termination 144 for the cable 20. The carrier modulated by remote-control information signal that is supplied from the modulator 35 is amplified by a transconductance amplifier 145 that resistively couples via the capacitor 143 and the coaxial cable 20 to the characteristic-impedance termination 132 in the FIG. 6 remote tuner 130 for causing a carrier modulated by remote-control information signal current to flow through that termination 132. This current is responsible for the carrier modulated by remote-control information signal component of the voltage that appears across the termination 132 and is applied by the buffer amplifier 135 to the bandpass coupler 136. It is this component of the voltage that the bandpass coupler 136 selects to the input circuit of the demodulator 24 included in the remote tuner 130 for demodulating the remote-control information signal.

The transconductance amplifier 145 also couples to the characteristic-impedance termination 144 in the portion of the local DTV receiver 140 shown in FIG. 7A and causes a carrier modulated by remote-control information signal current to flow through the termination 144. This current is responsible for a carrier modulated by remote-control information signal component of the voltage that appears across the termination 144. This voltage also has a first IF signal component responsive to a second portion of the output current of the transconductance amplifier 133 received via the coaxial cable 20, and this voltage also has a second IF signal component responsive to a second portion of the output current of the transconductance amplifier 134 received via the coaxial cable 20.

A buffer amplifier 146 applies the voltage that appears across the termination 144 to a bandpass coupler 147. The bandpass coupler 147 selects the first 11 signal component of the applied voltage to the input circuit of the AGC'd IF amplifier 100, which is the same in construction and operation as the AGC'd IF amplifier 100 in the local DTV receiver 90 of FIGS. 5A, 5B and 5C.

In the portion of the local DTV receiver 140 shown in FIG. 7B, a buffer amplifier 148 applies the voltage that appears across the termination 144 to a bandpass coupler 149. The bandpass coupler 149 selects the first IF signal component of the applied voltage to the input circuit of the AGC'd IF amplifier 40, which is the same in construction and operation as the AGC'd IF amplifier 40 in the local DTV receiver 90 of FIGS. 5A, 5B and 5C. Except for the buffer amplifier 148 and the bandpass coupler 149 being used to apply the first IF signal component of the applied voltage to the input circuit of the AGC'd IF amplifier 40 the portion of the local DTV receiver 140 shown in FIG. 7B is the same as the portion of the local DTV receiver 90 shown in FIG. 5B.

The precise nature of the characteristic-impedance termination 144 in FIG. 7A portion of the local DTV receiver 140 is of concern to the design, since the coaxial cable 20 should be terminated in its characteristic impedance both for the first IF signal and for the second IF signal. The characteristic-impedance termination 144 can simply be a resistor. This requires that the shunt capacitances at the input ports of the buffer amplifiers 146 and 148 be small enough that their capacitive reactance is small compared to the resistance of the resistor. A usual practice in this regard is neutralization of the amplifier devices using Miller feedback. Furthermore, the shunt capacitance at the output port of the transconductance amplifier 145 must be small enough that its capacitive reactance is small compared to the resistance of the resistor. The use of inductance in the connections of the amplifiers 145, 146 and 148 to the characteristic-impedance termination 144 resistor can mitigate the effects of the capacitances associated with these amplifiers for the first IF signal and for the second IF signal.

Another approach is to use a high-loss transmission line for the termination 144. Preferably, this high-loss transmission line is terminated in its characteristic impedance, has the same characteristic impedance as the coaxial cable 20, and exhibits minimal displacement capacitance at its connection with the coaxial cable 20. First IF signal and second IF signal at the characteristic-impedance termination 144 for the coaxial cable 20 continue propagation into the high-loss transmission line, but any reflection of these signals back from the characteristic-impedance termination at the other end of the high-loss transmission line are so greatly attenuated that line echo energy is inconsequential. De-coupling the coaxial cable 20 from the shunt capacitance at the output port of the transconductance amplifier 145 is still good practice, despite the use of the high-loss transmission line for the termination 144. So is neutralization of the shunt capacitances at the input ports of the buffer amplifiers 146 and 148

FIG. 7A shows a separate transconductance amplifier 145 cascaded after the modulator 35. If the modulator itself is designed to supply output current from a high source impedance, the separate transconductance amplifier 145 cascaded thereafter is dispensed with, of course. For example, the modulator may include a final amplitude-modulator constructed using an operational transconductance amplifier. Such a modulator is considered to be an equivalent of the cascade of modulator 35 followed by transconductance amplifier 145.

While frequency multiplexing of the first and second IF signals is currently preferred, there is an alternative approach that can be taken. In this alternative approach the two vestigial-sideband signals that are currently selected for reception are converted to double-sideband amplitude-modulation signals the carriers of which are of the same frequency but are in quadrature phasing with each other. The signals are then combined for application to the coaxial cable 20. This technique may be used together with frequency multiplexing if several DTV channels are to be simultaneously received.

Another, plural-conversion approach that can be taken is to frequency multiplex first and second IF signals that result from upconversion to the UHF band in the remote tuner, apply these UHF signals to the coaxial cable 20, and then in the local DTV receiver down-convert these UHF signals individually to VHF IF signals with similar carrier frequencies, or to VHF IF signals with non-overlapping frequency spectra. This approach is advantageous if several DTV channels are to be simultaneously received, in that harmonics of the UHF IF signals can fall far above the signals themselves in frequency. Terminating the coaxial cable 20 with its characteristic impedance for a number of contiguous 6-MHz-bandwidth IF signal channels can be easier to do, since their combined bandwidth is a smaller fraction of their absolute frequencies. Preventing radiation of the IF signals to the atmosphere can be a greater problem with UHF IF signals, however, than with IF signals of lower frequency.

Supposing that the local DTV receiver is of cable-ready design, still another plural-conversion approach is for the remote tuner to use IF signals reposing in the superband cable-TV channels. Then, in the local DTV receiver the remote tuner IF signals can be down-converted using the same set of converters used for developing PIP signals for reception from cable-TV signals.

One skilled in the art of television reception design will by acquaintance with the remote tuner concept taught in this specification be enabled to design a number of television reception systems employing a remote tuner, which observation should be borne in mind when evaluating the scope of the claims which follow.

What is claimed is:

1. A tuner for digital television signals within very-high-frequency or ultra-high-frequency bands prescribed for terrestrial television broadcast transmitters, said tuner designed to generate intermediate-frequency signals responsive to selected ones of radio-frequency signals transmitted over the air from terrestrial television broadcast transmitters and received by an antenna nearby said tuner, said tuner contained in a package for installation proximate to said antenna and remote from any subsequent receiver apparatus, said tuner equipped for driving a first end of a transmission line several meters long with said intermediate-frequency signals to be supplied from a second end of said transmission line to further digital television signal reception apparatus that recovers baseband digital television signals, said tuner separately packaged from said subsequent receiver apparatus which includes said further digital television signal reception apparatus and from apparatus for supplying remote control information, said tuner comprising:

electrically controlled front-end circuitry having an input port equipped for connection to said antenna to receive said radio-frequency signals therefrom and having an output port;

electrically controlled frequency-conversion circuitry included within said electrically controlled front-end circuitry for supplying a first intermediate-frequency signal with prescribed first carrier frequency as a frequency-conversion response to the one of the radio-frequency signals within said very-high-frequency or ultra-high-frequency bands that is selected for reception by said electrically controlled front-end circuitry, that said one of the radio-frequency signals being selected for reception responsive to said remote control information supplied from said apparatus for supplying remote control information;

an intermediate-frequency voltage amplifier included in said electrically controlled front-end circuitry and connected for supplying said output port of said electrically controlled front-end circuitry with an amplified response to said first intermediate-frequency signal, which amplified response is principally to the single selected one of said digital television signals; and a cable-driver amplifier having an input port connected to receive said frequency-selective amplified response to said first intermediate-frequency signal from the output port of said electrically controlled front-end and having an output port equipped for supplying a further amplified response to said first intermediate-frequency signal to said transmission line and thence to said further digital television signal reception apparatus via said transmission line, rather than said intermediate-frequency signals being directly supplied from said intermediate-frequency voltage amplifier to said further digital television signal reception apparatus, said intermediate-frequency voltage amplifier and said cable-driver amplifier having respective bandwidths wide enough to amplify the entirety of said single selected one of said digital television signals.

2. A tuner for digital television signals within very-high-frequency or ultra-high-frequency bands prescribed for terrestrial television broadcast transmitters, said tuner designed to generate intermediate-frequency signals responsive to selected ones of radio-frequency signals transmitted over the air from terrestrial television broadcast transmitters and received by an antenna nearby said tuner, said tuner equipped for driving a first end of a transmission line several meters long with said intermediate-frequency signals to be supplied from a second end of said transmission line to further digital television signal reception apparatus, said tuner separately packaged from said further digital television signal reception apparatus and an apparatus for supplying remote control which are in combination with said tuner and said transmission line, said tuner comprising:

electrically controlled front-end circuitry having an input port eQuipped for connection to said antenna to receive said radio-frequency signals therefrom and having an output port;

electrically controlled frequency-conversion circuitry included within said electrically controlled front-end circuitry for supplying a first intermediate-frequency signal with prescribed first carrier frequency as a frequency-conversion response to the one of the radio-frequency signals within said very-high-frequency or ultra-high-frequency bands that is selected for reception by said electrically controlled front-end circuitry, that said one of the radio-frequency signals being selected for reception responsive to said remote control information supplied from said apparatus for supplying remote control information;

an intermediate-frequency voltage amplifier included in said electrically controlled front-end circuitry and connected for supplying said output port of said electrically controlled front-end circuitry with an amplified response to said first intermediate-frequency signal, which amplified response is principally to the single selected one of said digital television signals; and a cable-driver amplifier having an input port connected to receive said frequency-selective amplified response to said first intermediate-frequency signal from the output port of said electrically controlled front-end and having an output port equipped for supplying a further amplified response to said first intermediate-frequency signal to said transmission line and thence to said further digital television signal reception apparatus via said transmission line, rather than said intermediate-frequency signals being directly supplied from said intermediate-frequency voltage amplifier to said further digital television signal reception apparatus, said intermediate-frequency voltage amplifier and said cable-driver amplifier having respective bandwidths wide enough to amplify the entirety of said single selected one of said digital television signals—said further digital television signal reception apparatus comprising:

demodulation and analog-to-digital conversion circuitry connected for responding to said first intermediate-frequency signal received from the second end of said transmission line to generate a baseband digital television signal;

adaptive digital filtering connected for equalizing the channel for said baseband digital television signal and suppressing echoes therein, adaptation of said adaptive digital filtering being facilitated by said tuner applying similar intermediate frequencies to the first end of said transmission line irrespective of which of said digital television signals within very-high-frequency or ultra-high-frequency bands is selected from which to generate said similar intermediate frequencies; and a symbol decoder connected for receiving said baseband digital television signal after equalization thereof and suppression of echoes therein, said symbol decoder connected for supplying data to the remainder of said digital television signal receiver and feeding back said data to said adaptive digital filtering to support the adaptation thereof.

3. A tuner for digital television signals within very-high-frequency or ultra-high-frequency bands prescribed for terrestrial television broadcast transmitters, said tuner designed to generate intermediate-frequency signals responsive to selected ones of radio-frequency signals transmitted over the air from terrestrial television broadcast transmitters and received by an antenna nearby said tuner, said tuner equipped for driving a first end of a transmission line several meters long with said intermediate-frequency signals to be supplied from a second end of said transmission line to further digital television signal reception apparatus, said tuner separately packaged from said further digital television signal reception apparatus and an apparatus for supplying remote control information which are in combination with said tuner and said transmission line, said tuner comprising:

electrically controlled front-end circuitry having an input port equipped for connection to said antenna to receive said radio-frequency signals therefrom and having an output port;

electrically controlled frequency-conversion circuitry included within said electrically controlled front-end circuitry for supplying a first intermediate-frequency signal with prescribed first carrier frequency as a frequency-conversion response to the one of the radio-frequency signals within said very-high-frequency or ultra-high-frequency bands that is selected for reception by said electrically controlled front-end circuitry, that said one of the radio-frequency signals being selected for reception responsive to said remote control information supplied from said apparatus for supplying remote control information;

an intermediate-frequency voltage amplifier included in said electrically controlled front-end circuitry and connected for supplying said output port of said electrically controlled front-end circuitry with an amplified response to said first intermediate-frequency signal, which amplified response is principally to the single selected one of said digital television signals; and a cable-driver amplifier having an input port connected to receive said frequency-selective amplified response to said first intermediate-frequency signal from the output port of said electrically controlled front-end and having an output port equipped for supplying a further amplified response to said first intermediate-frequency signal to said transmission line and thence to said further digital television signal reception apparatus via said transmission line, rather than said intermediate-frequency signals being directly supplied from said intermediate-frequency voltage amplifier to said further digital television signal reception apparatus—said further digital television signal reception apparatus comprising:

frequency-conversion apparatus for converting said further amplified response to said first intermediate-frequency signal received from the second end of said transmission line upward in frequency to generate a radio-frequency signal in a frequency range that can be detected by a broadcast digital television receiver.

4. A tuner for digital television signals within very-high-frequency or ultra-high-frequency bands prescribed for terrestrial television broadcast transmitters, said tuner designed for driving a first end of a transmission line several meters long with intermediate-frequency signals responsive to selected ones of radio-frequency signals transmitted over the air from terrestrial television broadcast transmitters and received by an antenna nearby said tuner, said tuner comprising:

first electrically controlled front-end circuitry having an input port to which the radio-frequency signals received by said antenna are applied and having an output port for supplying a first intermediate-frequency signal with prescribed first carrier frequency as a frequency-conversion response to the one of the radio-frequency signals within said very-high-frequency and ultra-high-frequency bands that is selected for reception by said first electrically controlled front-end circuitry, that said one of the radio-frequency signals being selected for reception responsive to first remote control information;

a first amplifier having an input port to which the output port of said first electrically controlled front-end circuitry connects to supply said first intermediate-frequency signal thereto and having an output port for supplying amplified first intermediate-frequency signal to said first end of said transmission line;

a demodulator having an input port for receiving a carrier modulated by remote control information signal and having a first output port for supplying a reproduction of said remote control information signal recovered from demodulating said carrier modulated by said remote control information signal; and electrical control circuitry connected for converting said reproduction of said remote control information signal to control signals for tunable radio-frequency amplifier and tunable local oscillator components of said first electrically controlled front-end circuitry, which said control signals impart said first remote control information to said first electrically controlled front-end circuitry.

5. The tuner of claim 4, wherein said input port of said demodulator is connected for receiving via said transmission line said carrier modulated by said remote control information signal, and wherein said first amplifier is arranged for driving said transmission line without short-circuiting said transmission line for frequencies outside a frequency range occupied by said amplified first intermediate-frequency signal, which said frequencies will appear in electrical signals to be received by said tuner via said transmission line and include each modulation frequency of said carrier modulated by said remote control information signal.

6. A tuner for digital television signals, said tuner designed for driving a transmission line several meters long with intermediate-frequency signals responsive to selected ones of radio-frequency signals received by an antenna nearby said tuner, said tuner comprising:

first electrically controlled front-end circuitry having an input port to which the radio-frequency signals received by said antenna are applied and having an output port for supplying a first intermediate-frequency signal with prescribed first carrier frequency as a frequency-conversion response to the one of the radio-frequency signals selected for reception by said first electrically controlled front-end circuitry, said one of the radio-frequency signals being selected for reception responsive to first remote control information;

a demodulator having an input port for receiving a carrier modulated by remote control information signal and having a first output port for supplying first remote control information recovered from demodulating said carrier modulated by said remote control information signal;

a first amplifier having an input port to which the output port of said first electrically tunable front-end circuitry connects to supply first intermediate-frequency signal thereto and having an output port for supplying amplified first intermediate-frequency signal to said transmission line, said first amplifier being of a type presenting a source impedance at the output port thereof that is not larger than being comparable to the characteristic impedance of a prescribed type of transmission line, said first amplifier being arranged for driving said transmission line without short-circuiting said transmission line for frequencies outside a frequency range occupied by said amplified first intermediate-frequency signal, which said frequencies will appear in electrical signals to be received by said tuner via said transmission line and include each modulation frequency of said carrier modulated by said remote control information signal; and a first bandpass coupler network for coupling the output port of said first amplifier to said transmission line over a range of frequencies occupied by said amplified first intermediate-frequency signal.

7. The tuner of claim 6, further comprising:

a first characteristic-impedance termination for said prescribed type of transmission line at the input port of said demodulator;

a second bandpass coupler network for coupling said transmission line to said first characteristic-impedance termination over a range of frequencies occupied by said carrier modulated by remote control information signal.

8. A combination in which the tuner of claim 6 is connected by said transmission line to apparatus for remotely controlling said first electrically controlled front-end circuitry, which apparatus comprises:

circuitry for generating said remote control information signal;

a modulator having an input port connected for receiving said remote control information signal as a modulating signal and having an output port for supplying said carrier modulated by remote control information signal; and a third bandpass coupler network for coupling the output port of said modulator to said transmission line over the range of frequencies occupied by said carrier modulated by remote control information signal.

9. The combination of claim 8, wherein said apparatus for remotely controlling said first electrically controlled front-end circuitry is included within a digital television signal receiver further comprising:

a second characteristic-impedance termination for said prescribed type of transmission line;

a fourth bandpass coupler network for coupling said transmission line to said second characteristic-impedance termination over the range of frequencies occupied by said amplified first intermediate-frequency signal; and circuitry for demodulating and digitizing said first intermediate-frequency signal, as coupled to said second characteristic-impedance termination, to generate a baseband digital television signal for further processing within said digital television signal receiver.

10. The tuner of claim 6, wherein said demodulator is of a type having a second output port for supplying second remote control information recovered from demodulating said carrier modulated by remote control information signal, said tuner further comprising:

second electrically controlled front-end circuitry having an input port to which the radio-frequency signals received by said antenna are applied and having an output port for supplying a second intermediate-frequency signal with prescribed second carrier frequency responsive to the one of the radio-frequency signals selected for reception by said second electrically controlled front-end circuitry responsive to second remote control information recovered by said demodulator;

a second amplifier having an input port to which the output port of said second electrically tunable front-end circuitry connects to supply second intermediate-frequency signal thereto and having an output port to supply amplified second intermediate-frequency signal to said transmission line as terminated to provide a transmission line of apparently infinite length for said amplified second intermediate-frequency signal, the output port of said second amplifier having a source impedance that is not larger than being comparable to the characteristic impedance of a prescribed type of transmission line; and a second bandpass coupler network for coupling the output port of said second amplifier to said transmission line over a range of frequencies occupied by said amplified second intermediate-frequency signal.

11. The tuner of claim 10, further comprising:
a first characteristic-impedance termination for said prescribed type of transmission line at the input port of said demodulator;
a third bandpass coupler network for coupling said transmission line to said characteristic-impedance termination over a range of frequencies occupied by said carrier modulated by remote control information signal.

12. A combination in which the tuner of claim 11 is connected by said transmission line to apparatus for remotely controlling both said first electrically controlled front-end circuitry and said second electrically controlled front-end circuitry, which apparatus comprises:
circuitry for generating said remote control information signal;
a modulator having an input port connected for receiving said remote control information signal as a modulating signal and having an output port for supplying said carrier modulated by remote control information signal; and
a fourth bandpass coupler network for coupling the output port of said modulator to said transmission line over the range of frequencies occupied by said carrier modulated by remote control information signal.

13. The combination of claim 12, wherein said apparatus for remotely controlling both said first electrically controlled front-end circuitry and said second electrically controlled front-end circuitry is included within a digital television signal receiver further comprising:
second and third characteristic-impedance terminations for said prescribed type of transmission line;
a fifth bandpass coupler network for coupling said transmission line to said second characteristic-impedance termination over the range of frequencies occupied by said amplified first intermediate-frequency signal;
circuitry for demodulating and digitizing said first intermediate-frequency signal, as coupled to said second characteristic-impedance termination, to generate a first baseband digital television signal;
a sixth bandpass coupler network for coupling said transmission line to said third characteristic-impedance termination over the range of frequencies occupied by said amplified second intermediate-frequency signal;
circuitry for demodulating and digitizing said second intermediate-frequency signal, as coupled to said third characteristic-impedance termination, to generate a second baseband digital television signal;
circuitry for further processing within said digital television signal receiver said first and second baseband digital television signals for recovering respective first and second sets of video signals; and
apparatus for generating a picture-in-picture video display responsive to said first and second sets of video signals.

14. A tuner for digital television signals, said tuner designed for driving a transmission line several meters long with intermediate-frequency signals responsive to selected ones of radio-frequency signals received by an antenna nearby said tuner, said tuner comprising:
first electrically controlled front-end circuitry having an input port to which the radio-frequency signals received by said antenna are applied and having an output port for supplying a first intermediate-frequency signal with prescribed first carrier frequency as a frequency-conversion response to the one of the radio-frequency signals selected for reception by said first electrically controlled front-end circuitry, said one of the radio-frequency signals being selected for reception responsive to first remote control information;
a demodulator having an input port for receiving a carrier modulated by remote control information signal and having a first output port for supplying first remote control information recovered from demodulating said carrier modulated by said remote control information signal;
a first amplifier having an input port to which the output port of said first electrically tunable front-end circuitry connects to supply first intermediate-frequency signal thereto and having an output port for supplying amplified first intermediate-frequency signal to said transmission line, said first amplifier being a first transconductance amplifier,
said first amplifier being arranged for driving said transmission line without short-circuiting said transmission line for frequencies outside a frequency range occupied by said amplified first intermediate-frequency signal, which frequencies will appear in electrical signals to be received by said tuner via said transmission line and include each modulation frequency of said carrier modulated by said remote control information signal;
a first characteristic-impedance termination for a prescribed type of transmission line, the output port said first transconductance amplifier coupling to said first characteristic-impedance termination; and
a first bandpass coupler network for coupling said first characteristic-impedance termination to the input port of said demodulator over a range of frequencies occupied by said carrier modulated by remote control information signal.

15. A combination in which the tuner of claim 14 is connected by said transmission line to apparatus for remotely controlling said first electrically controlled front-end circuitry, which apparatus comprises:
a second characteristic-impedance termination for said prescribed type of transmission line to which said transmission line couples for said amplified intermediate-frequency signal and for said carrier modulated by remote control information signal;
circuitry for generating said remote control information signal;
a modulator having an input port connected for receiving said remote control information signal as a modulating signal and having an output port for supplying said carrier modulated by remote control information signal; and
a further transconductance amplifier having an input port to which the output port of said modulator couples and having an output port coupled to said second characteristic-impedance termination.

16. The combination of claim 15, wherein said apparatus for remotely controlling said first electrically controlled front-end circuitry is included within a digital television signal receiver further comprising:
a second bandpass coupler network for selectively coupling said amplified first intermediate-frequency signal from said second characteristic-impedance termination; and
circuitry for demodulating and digitizing said amplified first intermediate-frequency signal, as selectively coupled thereto by said second bandpass coupler network, to generate a baseband digital television signal for further processing within said digital television signal receiver.

17. The tuner of claim 14, further comprising:

second electrically controlled front-end circuitry having an input port to which the radio-frequency signals received by said antenna are applied and having an output port for supplying a second intermediate-frequency signal with prescribed second carrier frequency responsive to the one of the radio-frequency signals selected for reception by said second electrically controlled front-end circuitry responsive to second remote control information recovered by said demodulator; and a second transconductance amplifier having an input port to which the output port of said second electrically tunable front-end circuitry connects to supply second intermediate-frequency signal thereto and having an output port for supplying amplified second intermediate-frequency signal connected to said first characteristic-impedance termination.

18. A combination in which the tuner of claim 17 is connected by said transmission line to apparatus for remotely controlling both said first electrically controlled front-end circuitry and said second electrically controlled front-end circuitry, which apparatus comprises:

a second characteristic-impedance termination for said prescribed type of transmission line to which said transmission line couples for said amplified first intermediate-frequency signal, for said amplified second intermediate-frequency signal and for said carrier modulated by remote control information signal;

circuitry for generating said remote control information signal;

a modulator having an input port connected for receiving said remote control information signal as a modulating signal and having an output port for supplying said carrier modulated by remote control information signal; and a further transconductance amplifier having an input port to which the output port of said modulator couples and having an output port coupled to said second characteristic-impedance termination.

19. The combination of claim 18, wherein said apparatus for remotely controlling both said first electrically controlled front-end circuitry and said second electrically controlled front-end circuitry is included within a digital television signal receiver further comprising:

circuitry for demodulating and digitizing said amplified first intermediate-frequency signal, as selectively coupled thereto from said second characteristic-impedance termination, to generate a first baseband digital television signal;

circuitry for demodulating and digitizing said amplified second intermediate-frequency signal, as selectively coupled thereto from said second characteristic-impedance termination, to generate a second baseband digital television signal;

circuitry for further processing within said digital television signal receiver said first and second baseband digital television signals for recovering respective first and second sets of video signals; and apparatus for generating a picture-in-picture video display responsive to said first and second sets of video signals.

20. A combination in which the tuner of claim 5 is connected by said transmission line to a digital television signal receiver that comprises:

demodulation and analog-to-digital conversion circuitry connected for responding to said first intermediate-frequency signal to generate a baseband digital television signal;

circuitry for generating said remote-control information signal, said remote control information signal descriptive of at least said first remote control information; and a modulator for generating said carrier modulated by said remote control information signal and coupling said carrier modulated by said remote control information signal to said transmission line.

21. A combination in which the tuner of claim 5 is connected by said transmission line to an apparatus comprising:

circuitry for generating said remote-control information signal, said remote control information signal descriptive of at least said first remote control information;

a modulator for generating said carrier modulated by said remote control information signal and coupling said carrier modulated by said remote control information signal to said transmission line; and electrically controlled frequency-conversion apparatus for converting said first intermediate-frequency signal to a radio-frequency signal in a frequency range that can be detected by a broadcast digital television receiver.

22. A tuner for digital television signals within very-high-frequency or ultra-high-frequency bands prescribed for terrestrial television broadcast transmitters, said tuner designed to generate intermediate-frequency signals responsive to selected ones of radio-frequency signals transmitted over the air from terrestrial television broadcast transmitters and received by an antenna nearby said tuner, said tuner equipped for driving a first end of a transmission line several meters long with said intermediate-frequency signals to be supplied from a second end of said transmission line to further digital television signal reception apparatus that recovers baseband digital television signals, said tuner separately packaged from said further digital television signal reception apparatus and an apparatus for supplying remote control information, said tuner comprising:

electrically controlled front-end circuitry having an input port equipped for connection to said antenna to receive said radio-frequency signals therefrom and having an output port;

electrically controlled frequency-conversion circuitry included within said electrically controlled front-end circuitry for supplying a first intermediate-frequency signal with prescribed first carrier frequency as a frequency-conversion response to the one of the radio-frequency signals within said very-high-frequency or ultra-high-frequency bands that is selected for reception by said electrically controlled front-end circuitry, that said one of the radio-frequency signals being selected for reception responsive to said remote control information supplied from said apparatus for supplying remote control information;

an intermediate-frequency voltage amplifier included in said electrically controlled front-end circuitry and connected for supplying said output port of said electrically controlled front-end circuitry with an amplified response to said first intermediate-frequency signal, which amplified response is principally to the single selected one of said digital television signals;

a cable-driver amplifier having an input port connected to receive said frequency-selective amplified response to said first intermediate-frequency signal from the output port of said electrically controlled front-end and having an output port equipped for supplying a further amplified response to said first intermediate-frequency signal to said transmission line and thence to said further digital television signal reception apparatus via said transmission line, rather than said intermediate-frequency signals being directly supplied from said intermediate-frequency voltage amplifier to said further digital television signal reception apparatus, said cable-driver amplifier being of a type for presenting a source impedance at the output port thereof that is not larger than being comparable to the characteristic impedance of a prescribed type of transmission line; and a first bandpass coupler network for coupling the output port of said cable-driver amplifier to said transmission line over a range of frequencies occupied by said amplified first intermediate-frequency signal.

23. A tuner for digital television signals within very-high-frequency or ultra-high-frequency bands prescribed for terrestrial television broadcast transmitters, said tuner designed for driving a transmission line several meters long with intermediate-frequency signals responsive to selected ones of radio-frequency signals transmitted over the air from terrestrial television broadcast transmitters and received by an antenna nearby said tuner, said tuner comprising:

first electrically controlled front-end circuitry having an input port to which the radio-frequency signals received by said antenna are applied and having an output port for supplying a first intermediate-frequency signal with prescribed first carrier frequency as a frequency-conversion response to the one of the radio-frequency signals within said very-high-frequency or ultra-high-frequency bands that is selected for reception by said first electrically controlled front-end circuitry, that said one of the radio-frequency signals being selected for reception responsive to first remote control information; and a first amplifier having an input port to which the output port of said first electrically controlled front-end circuitry connects to supply said first intermediate-frequency signal thereto and having an output port for supplying amplified first intermediate-frequency signal to said transmission line—said first electrically controlled front-end circuitry in said tuner comprising:

electrically tuned radio-frequency amplifier circuitry connected to be tuned responsive to said first remote control information to selectively amplify one of said radio-frequency signals supplied via the input port of said first electrically controlled front-end circuitry, said radio-frequency amplifier circuitry connected for supplying a response to the selectively amplified one of said radio-frequency signals, said radio-frequency amplifier circuitry connected for having the gain of its said response controlled by an automatic gain control signal applied thereto;

an electrically tuned local oscillator connected to be tuned responsive to said first remote control information for supplying local oscillations of a frequency determined by said first remote control information;

frequency conversion circuitry connected for receiving as a first input signal thereof said local oscillations, connected for receiving as a second input signal thereof said radio-frequency amplifier circuitry response to the selectively amplified one of said radio-frequency signals, and connected for supplying a modulated carrier wave at said prescribed first carrier frequency;

intermediate-frequency amplifier circuitry having an input port connected to receive said modulated carrier wave at said prescribed first carrier frequency supplied from said frequency conversion circuitry and having an output port connected to supply said first intermediate-frequency signal to said input port of said first amplifier;

an envelope detector connected for developing an envelope detector response to said first intermediate-frequency signal; and automatic gain control signal generation circuitry connected for responding to said envelope detector response to generate said automatic gain control signal applied to said radio-frequency amplifier circuitry.

24. The tuner of claim 23, further comprising:

a demodulator having an input port for receiving a carrier modulated by remote control information signal and having a first output port for supplying demodulated remote control information signal recovered from demodulating said carrier modulated by remote control information signal; and electrical control circuitry connected for converting said demodulated remote control information signal to control signals for said electrically tuned radio-frequency amplifier circuitry and said electrically tuned local oscillator, which said control signals impart said first remote control information to said first electrically controlled front-end circuitry.

25. The tuner of claim 24, wherein said first amplifier is arranged for driving said transmission line without short-circuiting said transmission line for frequencies in electrical signals to be received by said tuner via said transmission line, said tuner further comprising:

a second bandpass coupler network for coupling said input port of said demodulator to receive from said transmission line said carrier modulated by said remote control information signal.

26. The tuner of claim 5 in combination with remote control apparatus for generating said carrier modulated by remote control information signal, said remote control apparatus comprising:

circuitry for generating said remote-control information signal to be used as modulating signal for said carrier modulated by remote control information signal; and a modulator having an input port connected for receiving said modulating signal and having an output port for supplying said modulated signal, the modulation of which said modulated signal is determined responsive to said remote control information signal and at times is composed of several simultaneously occurring frequencies; and a coupling network for coupling said modulated signal to the second end of said transmission line, said coupling network designed to avoid causing significant echoes in the response at the second end of said transmission line to a television signal applied to the first end of said transmission line at said site of said reception antenna.

27. The combination of claim 26, wherein said modulator is of a type providing a multiple-tone type of modulation, so said modulated signal sometimes comprises several tones coupled simultaneously to said proximal end of said transmission line.

28. The combination of claim 26, wherein said remote control information signal comprises channel identifier signal concerning channel selection of said television signal to be applied to the first end of said transmission line.

29. The combination of claim 28, wherein said remote control apparatus is included in a local digital television receiver adapted for receiving said amplified first intermediate-frequency signal from the second end of said transmission line; said local demodulator apparatus further comprising:

amplifier circuitry with automatic gain control connected for supplying a controlled-gain response to said amplified first intermediate-frequency signal as delivered at the second end of said transmission line;

demodulation and analog-to-digital conversion circuitry connected for responding to said controlled-gain response to said amplified first intermediate-frequency signal to generate a baseband digital television signal;

channel equalization and echo suppression filtering connected for equalizing the channel for said baseband digital television signal and suppressing echoes therein;

a trellis decoder connected for symbol decoding said baseband digital television signal after channel equalization and echo suppression to reproduce a convolutionally interleaved data stream;

a deinterleaver connected for de-interleaving said convolutionally interleaved data stream to recover a succession of Reed-Solomon coded packets of randomized data;

a Reed-Solomon error corrector connected for correcting, insofar as possible, said succession of Reed-Solomon coded packets of randomized data to generate correct packets of randomized data;

a data de-randomizer connected for de-randomizing said correct packets of randomized data to generate packets of de-randomized data supplied as a transport stream.

30. The combination of claim 29, wherein said local digital television receiver is of a special type that omits local tuner circuitry for selecting television signals from the very-high-frequency or ultra-high-frequency bands prescribed for terrestrial television broadcast transmitters.

31. The combination of claim 29, wherein said local digital television receiver is of cable-ready type having local tuner circuitry for selecting television signals from superband channels prescribed for cable television transmitters, and wherein said first intermediate-frequency signal is disposed within one of said superband channels.

32. The combination of claim 28, wherein said remote control apparatus is included in a local converter apparatus adapted for receiving said amplified first intermediate frequency signal as delivered at the second end of said transmission line, said local converter apparatus further comprising:

a frequency converter for converting said first amplified intermediate-frequency signal as delivered at the second end of said transmission line to a radio-frequency television broadcast signal receivable by a television receiver for terrestrial broadcast television signals.

33. The tuner of claim 1, wherein said electrically controlled front-end circuitry includes:

electrically tuned radio-frequency amplifier circuitry connected to supply said electrically controlled frequency-conversion circuitry with a selectively amplified response to said one of said radio-frequency signals that is supplied via the input port of said first electrically controlled front-end circuitry that is selected for reception, which selection is made by said radio-frequency amplifier circuitry responsive to electrical tuning thereof by said remote control information.

* * * * *